(12) United States Patent
Nishimoto

(10) Patent No.: US 6,336,693 B2
(45) Date of Patent: Jan. 8, 2002

(54) FULL VACUUM HEAT INSULATION BOX BODY AND METHOD FOR PRODUCING AND DISASSEMBLING THE SAME

(75) Inventor: Yoshio Nishimoto, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/871,982

(22) Filed: Jun. 4, 2001

Related U.S. Application Data

(63) Continuation of application No. 09/227,855, filed on Jan. 11, 1999, now Pat. No. 6,305,768.

(30) Foreign Application Priority Data

| Jan. 27, 1998 | (JP) | 10-013873 |
| Jul. 23, 1998 | (JP) | 10-207647 |

(51) Int. Cl.[7] .............................................. A47B 91/00
(52) U.S. Cl. .................. 312/406; 312/400; 220/592.05
(58) Field of Search ................................. 312/400, 401, 312/406, 406.1; 62/465; 220/592.05, 592.09, 592.27

(56) References Cited

FOREIGN PATENT DOCUMENTS

| EP | 0071090 A1 | * | 2/1983 |
| JP | 57-52783 | * | 3/1982 |
| JP | 60-71881 | * | 4/1985 |
| JP | 60-205164 | * | 10/1985 |
| JP | 02192580 | * | 7/1990 |
| JP | 2-235982 | * | 9/1990 |
| JP | 03140782 A | * | 6/1991 |
| JP | 07096580 A | * | 4/1995 |

* cited by examiner

Primary Examiner—Peter M. Cuomo
Assistant Examiner—Jerry A. Anderson
(74) Attorney, Agent, or Firm—Oblon, Spivak, McClelland, Maier & Neustadt, P.C.

(57) ABSTRACT

A heat insulation box body includes inner and outer boxes forming a shell of the heat insulation box body and triangular structural materials inserted in the shell held by close-contact by means of a vacuum. Further, at the time of disassembling the heat insulation box body after scrapping, a shell surface is cut and air is introduced into the inside of the shell to return the state of the shell to an atmospheric pressure state and then respective members are separated from each other.

2 Claims, 15 Drawing Sheets

FULL VACUUM HEAT INSULATION BOX BODY AND METHOD FOR PRODUCING AND DISASSEMBLING THE SAME

This application is a Continuation of application Ser. No. 09/227,855 Filed on Jan. 11, 1999 which has been allowed as U.S. Pat. No. 6,305,768.

BACKGROUND OF THE INVENTION

1. Field of the Invention

The present invention relates to heat insulation walls requiring heat insulation in a heat insulation box body such as a refrigerator, or the like, in which wall surfaces are formed of thin metal plates, resin moldings, or the like. More particularly, the present invention relates to a full vacuum heat insulation box body in which porous structural materials are disposed in a shell constituting heat insulation walls for the purpose of preventing deformation so that a vacuum is kept, a refrigerator using such a full vacuum heat insulation box body, a method for producing such a full vacuum heat insulation box body, and a method for disassembling such a full vacuum heat insulation box body.

2. Description of the Related Art

Conventionally, a shell of a refrigerator, or the like, is so constituted that an outer box is formed of a thin metal plate such as an iron plate, an inner box is formed of a resin molding, and closed-cell foaming urethane used for forming a structural material, is injected into a gap between the inner and outer boxes and foamed so that the gap is filled with the structural material.

FIG. 16 is a flow chart illustrating a process of producing a conventional refrigerator using closed-cell foaming urethane as a heat insulating material in walls, and FIG. 17 illustrates a foaming urethane injection step in the process.

That is, in a conventional refrigerator, or the like, an inner box 2 obtained by attaching necessary members, such as an anchor for fixing interior parts, piping for supplying a refrigerant, etc., to a vacuum molding of an ABS resin sheet, is inserted in an outer box of a formed product obtained by bending a steel plate to thereby form a shell. Injection portions 4 are provided in the outer box 1 (step 1) to inject a mixture solution 3 of foaming urethane.

After sheet metal worked parts are attached to the back and bottom portions which are residual opening portions, a slight gap in each engaging portion is sealed with a hot melt adhesive agent, or the like, and further interior parts are partially assembled (step 2).

The thus obtained box body is laid down as shown in FIG. 17, and fixed in a foaming jig heated to an arbitrary temperature. After a mixing head 5 is successively inserted into and fixed to injection holes of the injection portions 4 provided in the outer box 1, a mixture solution 3 of foaming urethane is discharged and injected. Then, injection portions 4 are sealed with plugs. Because the foaming urethane mixture solution 3, at the time of injection, is a liquid having an expansion ratio in a range from several times to tens of times, the mixture solution 3 flows in a flange portion corresponding to the opening portions of the box body through the injection portion 4 so as to disperse. Further, after some seconds, a foaming agent is vaporized by reaction heat of raw materials and thereby the foam is caused to fill the residual gap between the inner box 2 and the outer box 1 with urethane foam. A heat insulation box body thus formed can be taken out from the foaming jig after some minutes, generally about 5 minutes from the injection (step 3).

Residual parts, for example, electric parts such as a fan motor and a light and interior parts such as shelves and various kinds of casings are put in the thus obtained heat insulation box body. After refrigerant circuit securing parts for securing a refrigerant circuit are attached to the heat insulation box body, the refrigerant circuit is charged with a refrigerant. Thus, assembling of the product is completed (step 4).

Inspection of various kinds of functions of the completed product is carried out through an actual operation so as to confirm that the product is not defective (step 5).

When a package and documents pertinent to the obtained product are prepared and added, the production is completed (step 6).

It has been found that the chlorine containing 1,1-dichloro-1-fluoroethane (HFC141b), which is one of hydro-chlorofluorocarbons that has been used as a foaming agent for forming urethane foam used as a heat insulating material herein, is a cause of ozone layer destruction. Accordingly, use of hydrofluorocarbons or hydrocarbons which do not contain chlorine in their molecules, has been proposed in recent years.

For example, a method for producing urethane foam by use of hydrofluorocarbons such as 1,1,1,3,3-pentafluoropropane (HFC245fa) and 1,1,1,4,4,4-hexafluorobutane (HFC356mffm) as a foaming agent is disclosed in JP-A-2-235982, and a method for producing urethane foam by use of hydrocarbon such as cyclopentane, or the like, as a foaming agent is disclosed in JP-A-3-152160.

However, the heat insulating property of such urethane foam is in a range from 19 to 20 mw/MK and clearly inferior to the heat insulating property of 16 mw/MK of chlorofluorocarbons used before issue of regulations on use of ozone layer destruction substances.

Since the improvement of the heat insulating property of urethane foam has reached a limit, a technique of applying a vacuum heat insulation panel which has more than twice as higher heat insulating property as the urethane foam as shown in the comparison view of FIG. 18 has been proposed for a refrigerator, or the like, allowing a reduction of electric power consumption without use of any substance which causes ozone layer destruction.

For example, JP-A-60-243471 discloses a heat insulation box body in which a member obtained by putting pulverized PUF in a synthetic resin bag and vacuum-packing the pulverized PUF in the form of a board is disposed inside walls, and JP-A-60-60483 proposes a refrigerator in which a vacuum heat insulation panel having a gap which is provided in the flange side of a side plate to allow PUF to flow in the gap is disposed in a side wall of the refrigerator.

The vacuum heat insulation panel such as those proposed above, has a structure shown in FIG. 19. A method for producing the vacuum heat insulation panel will be described below. First, a core material 11 having a porous structure such as an aggregate of fibers or particles, a foam having open cells, or the like, is inserted into a bag-like packing material 12. Then, in order to generate a high quality heat insulating property, its inside is deaerated by using a vacuum panel making machine 15 comprising fusion-bonding devices 17 each having a heater 17a, sealing pressure devices 18, and a vacuum control valve 16 as shown in FIG. 20. While a vacuum state is maintained, end edge portions 12a of the packing material 12 containing the core material 11 are heat-sealed to prevent external air from entering inside. Thus, a vacuum heat insulation panel 13 shown in FIG. 19 is obtained. Preferably, the inside of the vacuum panel making machine 15 is kept to $10^{-2}$ torr when the end edge portions 12a are subjected to fusion bonding. Therefore, adjustment of the degree of vacuum is performed by use of the vacuum control valve 16 connected to an evacuator not shown.

Accordingly, in the packing material 12, a thin metal film layer is used as its intermediate layer for blocking or suppressing entrance of gas from the outside into the vacuum heat insulation panel to thereby keep a heat insulating property. A material having excellent welding property is used as its inner layer so that insertion openings can be sealed perfectly, and a material for stably securing adhesion to urethane foam is used as its surface layer so that generation of scratches is suppressed and bending strength of walls in a box body such as a refrigerator, or the like, can be secured. Because the packing material 12 is required to have various characteristics as described above, a multilayer sheet in which different materials are laminated to satisfy the required characteristics is used.

Further, the core material 11 must have a strength higher than atmospheric pressure to satisfy a function of holding the panel shape in a vacuum state and the quantities of conducted heat (heat conduction) and penetrated heat (heat radiation) through a substance constituting the core material itself must be suppressed to thereby contribute to improvement of heat insulating property. Accordingly, a porous plate formed of a substance with small heat transfer rate is used as the core material 11.

That is, in order to improve the heat insulating property of the vacuum heat insulating panel 13, it is important to use a substance that is a good insulator for the core material 11 among constituent materials, reduces the heat-conduction area of the material to suppress the heat conduction through the substance, and reduces the gap to suppress heat radiation. As a substance satisfying the aforementioned conditions, a porous material of resin, glass, or the like, is preferably used. In particular, a mat of glass fiber, a board of a resin foam having open cells, or a molding of resin or inorganic fine particles is used preferably.

For example, JP-A-60-71881 has proposed a material obtained by putting pearlite powder in a synthetic resin bag and vacuum-packing it into the form of a board. Similarly, JP-A-60-243471 has proposed a material obtained by putting pulverized PUF in a synthetic resin bag and vacuum-packing it into the form of a board. As other proposals, JP-A-60-205164 has proposed hard polyurethane foam having open cells, JP-A-4-218540 has proposed a plate-like molding which is formed from thermoplastic urethane resin powder firmly bonded and, JP-A-7-15 96580 has proposed a board which comprises long glass fiber, fibrillated resin fiber and inorganic fine powder, each of which is applied as a core material of the vacuum heat insulation panel.

Each of the vacuum heat insulation panels, such as those proposed above, is generally shaped as a board or a substrate having a thickness in a range from 10 to 20 mm and is typically incorporated into the wall of the refrigerator. That is, after the inner box is inserted into the outer box equipped with the vacuum heat insulation panels stuck thereon so that the inner box is united with the outer box, a raw material mixture solution of foaming urethane is injected thereto, foamed and molded to thereby form a heat insulation wall.

Accordingly, in the case of a refrigerator, the vacuum heat insulation panel is usually not stuck on the inner box having an uneven surface for shelf rests, or the like, but fixed to the outer box surface by use of an adhesive agent, or the like, so that foaming urethane to fill the gap in the shell containing the vacuum heat insulation panels disposed therein is fully packed without any remaining gap to thereby prevent spoilage of design characteristic such as deformation, or the like.

However, in the cases that the packing material has some fine defect which is larger than expected, a part of the packing material is destroyed by an external factor or a large amount of volatile substance remains in or sticks to the core material, thereby creating a number of possibilities that a desired heat insulating property cannot be provided.

As described above, in the heat insulation wall structure of the conventional heat insulation box body, the vacuum heat insulation panel is disposed in the shell and the residual space is filled with urethane foam having closed cells. Therefore, if the aforementioned failure occurs in the vacuum heat insulation panel, it is not only very difficult to repair the vacuum heat insulation panel but also impossible to replace the vacuum heat insulation panel with a new one. That is, the heat insulation wall is conventionally formed on the assumption that the whole of a system such as a heat insulation box body, a refrigerator, or the like, must be scrapped when the aforementioned failure occurs.

As a method to enable lowering of the degree of vacuum caused by the aforementioned possibilities to be repaired, there has been proposed a heat insulation box body having heat insulation walls in which all the inside of the shell of the heat insulation box body is set in a vacuum state. For example, JP-A-57-52783 has proposed to insert an air-permeable bag containing a powder substance into the gap between the inner and outer boxes, JP-A-3-140782 has proposed to put particles of pearlite, or the like, into the hollow resin shell, and JP-A-2-192580 and JP-A-7-148752 have proposed to inject foaming heat insulating material such as foaming urethane with open cells into the shell. Each of the shells is evacuated with a vacuum pump, or the like, through a gas exhaust hole provided in a part of the shell to secure the vacuum state inside the shell of the heat insulation box body.

In the conventional heat insulation box body configured so that all the heat insulation wall is kept in a vacuum state as described above, it has been found that it is very difficult to fill the inside of the shell with a powder or granular substance uniformly and densely when the powder or granular substance is put in the shell. Accordingly, if the inside of the shell is kept in a vacuum state, the shell is pressed by atmospheric pressure so as to be partly or wholly contracted, so that deterioration of design characteristic may be caused or in some cases, deterioration of heat insulating property caused by reduction of the wall thickness may be triggered.

Further, in filling a heat insulation box body having inferior filling property such as a large-size refrigerator, or the like, a larger amount of filling is required than the amount of filling corresponding to the density for obtaining a strength required to prevent deformation caused by the atmospheric pressure.

Accordingly, there arise disadvantages such as economical loss, increase of weight, lowering of heat insulating property, etc.

Further, in filling the heat insulation box body with open-cell foaming urethane, communication of bubbles cannot be sufficiently achieved so that closed cells remain, if bubbles in a foamed state flow over a short distance from the start point of foaming, bubbles flow in a state of stable shape after completion of bubble growth, and so on.

Further, because foaming gas remaining in bubbles remains in cells or is adsorbed into a resin constituting cells even in a portion in which communication of cells is achieved, foaming gas remains. Accordingly, if this is used as it is, for a structural material, there arises a disadvantage that not only a long time is required for evacuation particularly of a large-size full vacuum heat insulation box body but also a degree of vacuum changes is lost over the passage of time.

That is, in accordance with the aforementioned proposals, it is indispensable to perform troublesome evacuation substantially periodically by use of a vacuum pump, or the like, or to incorporate a suction system for the purpose of preventing a drop in the degree of vacuum due to generation of gas in the shell. Furthermore, in a state where the inside of the shell is filled with no gap, a long evacuation time is required because this structure brings a great disadvantage for sucking remaining gas in an opposite portion inside the shell to the gas-exhaust hole up to all open cells through a long distance along open cells by use of a vacuum pump from a gas-exhaust hole provided in an end portion of the heat insulation box body such as a refrigerator, or the like, to thereby perform evacuation to secure a sufficient vacuum state. Further, during the period when the degree of vacuum drops with the passage of time, a cooling operation is carried out frequently, so that electric power is additionally consumed and the temperature of the inside of the refrigerator becomes unstable to cause a problem in that the freshness of foods is affected.

Further, when the full vacuum heat insulation box body obtained by the conventional production method is to be disassembled after scrapping so as to recycle parts or members, some measures are required to prevent scattering of the filling materials at the time of disassembling or collecting in the former case of filling powder or granular materials, and it is also difficult to handle the materials without damage even in the case of employing a method in which the filling materials are disposed in a form protected by bags, or the like.

On the other hand, in the latter case of the full vacuum heat insulation box body in which a raw-material mixture solution of foaming urethane is injected into the shell and foamed to thereby form heat insulation walls, the filled urethane foam firmly self-adheres to the inner and outer boxes constituting the shell so as to be nearly inseparable therefrom when the box body is to be disassembled after scrapping to recycle the members. In the conventional method therefore, the shell is not separated into constituent members but the inner and outer boxes and the filled urethane foam self-adhering thereto are collectively subjected to a crusher so as to be broken up, and then, the crushed parts are separated into respective members by use of a separation method using weight or magnetic characteristic arranged for a subsequent step to the crusher, so that the outer box is magnetically attached, the inner box is made to fall down by itself by weight and the urethane foam is flown off, for example, laterally by use of wind, or the like. It is however impossible to perfectly separate the urethane foam self-adhering to the inner and outer boxes from adhering surfaces. Accordingly, used members cannot be reused and therefore, recycling of the members is difficult using the conventional methods.

SUMMARY OF THE INVENTION

A technical object of the present invention is to entirely hold the inside of heat insulation walls in a vacuum state as well as to provide easy evacuation, light-weight and uniform strength, reduction of remaining gas and prevention of entrance of gas from the outside, and also to facilitate disassembling after scrapping of the heat insulation walls so as to simplify recycling of respective members.

In order to achieve the above object, according to one aspect of the present invention, a full vacuum heat insulation box body in which the inside of its heat insulation walls is filled with structural materials having continuous pores and kept in a vacuum state, is constructed such that inner and outer boxes constituting a shell of the heat insulation box body and the structural material put between the inner and outer boxes are held only by close-contact caused by means of a vacuum. With this configuration, the constituent materials of the box body can be separated and collected easily when disassembling the box body after scrapping, without leaving material on the abutting parts.

Preferably, the shell of the heat insulation box body has an uneven surface, and the structural materials abutting on the uneven surface of the shell include moldings formed of a pulverized resin foam. With this configuration, a non-filling portion is not produced between the uneven surface of, for example, the inner box and the abutting surface of the structural materials, so that flaws in design characteristic such as surface deformation can be prevented even in the case where the inside of the shell is kept in a vacuum.

Preferably, the structural materials contain parts comprising grooves or holes for exhausting air and continuous pores. With this configuration, gas such as air remaining in the shell can be exhausted easily, resulting in a short time required for evacuation and a high degree of vacuum secured to improve heat insulating property.

Preferably, the structural materials are constituted by a resin foam having open cells. With this configuration, heat insulation walls with small heat conduction can be formed, so that the quantity of leaking heat can be suppressed and heat insulating properties can be improved.

Preferably, the structural materials have parts each having a triangular section, each of the triangular-section parts being disposed in a middle layer in the direction of wall thickness, or in a layer abutting an even surface of the shell. With this configuration, a wedge effect is obtained so that the walls are never slackened or deformed, and an inferior design characteristic such as deformation can be prevented.

Preferably, the parts having a triangular section are formed of polystyrene foam having open cells. With this configuration, dust, or the like, is never produced even if surfaces of the parts are rubbed in handling, moderate flexibility necessary for handling is provided to improve working efficiency, and a strength tolerant to the atmospheric pressure and a fine cell shape are provided to provide both excellent external appearance and heat insulating property.

Preferably, the polystyrene foam having open cells has flattened cells which are spread in a direction perpendicular to the direction of wall thickness. With this configuration, the effect of blocking radiation heat in a heat-insulating direction are improved.

Preferably, a joint portion between the inner and outer boxes is constituted by a groove of a predetermined depth formed by bending one of the boxes and is filled with a liquid substance having an adhesive sealing function and an end side portion formed in the other box so as to be able to be inserted into a deep portion of the groove. Joining and sealing of the joint portion are performed by the liquid substance by utilizing mutual attraction force produced at the time of evacuation of the shell. With this configuration, the inner and outer boxes can operate as a piston. Structural materials can be pressed from the outside by the inner and outer boxes, so that the degree of close-contact between the structural materials can be enhanced on the basis of a vacuum.

Preferably, an opening portion, which is later closed with a plate member, for inserting the structural materials is provided in the outer box, a joint portion between the outer box and the plate member is constituted by a groove of a predetermined depth formed by bending one of the outer box and the plate member and filled with a liquid substance having an adhesive sealing function and an end side portion formed in the other of them so as to be able to be inserted into a deep portion of the groove. Joining and sealing of the joint portion are performed by the liquid substance by utilizing mutual attraction force produced at the time of evacuation of the shell. With this configuration, the plate member can operate as a piston. Structural materials disposed in the opening portion can be pressed from the back side by the plate member, so that the degree of close-contact between the structural materials can be enhanced on the basis of a vacuum.

Preferably, the groove is formed by bending an end edge portion inward in a zigzag arrangement. With this configuration, a gap continuous along the whole circumference of the joint portion can be formed between a base end piece of the zigzag bent portion and the outer circumferential surface of the outer box and the distance from the outer box to the structural materials can be made longer. Accordingly, at the time of disassembling after scrapping an opposite portion of the outer circumferential surface of the outer box to the base end piece of the zigzag bent portion can be cut easily without keeping cutting depth accurate. Accordingly, air can be introduced inside and the shell can be opened easily, so that respective structural materials can be taken out without damage and collected.

Preferably, the groove has a wide reservoir portion at its upper portion for reserving a liquid substance to prevent it from overflowing from the groove. With this configuration, the shell can be filled with an amount of adhesive agent sufficient to seal and the adhesive agent can be also prevented from overflowing to the outside, so as to improve workability and prevent both staining of a core material with the adhesive agent and adhesion of structural materials to the shell by the adhesive agent.

Preferably, the liquid substance is constituted by an adhesive agent containing particles or powder of a metal oxide or a metal nitride With this configuration, permeation of various kinds of gasses, water vapors, etc. can be suppressed, so that degradation of heat insulating property caused by vacuum loss over time can be prevented.

Preferably, a mark or indicia is provided in the outer circumferential surface of the zigzag bent portion. With this configuration, a portion to be cut without damage of structural materials to be collected can be easily found at the time of disassembly.

According to another aspect of the present invention, a method for producing a full vacuum heat insulation box body includes integrating an inner box and an outer box onto a first shell which is opened in an open bottom surface of the outer box, inserting a first structural material having continuous pores and a triangular section into the inside of a space formed between the inner and outer boxes constituting the first shell through the opening of the first shell, by inserting a bottom side portion of the first structural material ahead, inserting a second structural material having continuous pores and a triangular section into the space through the opening of the first shell by inserting a vertex portion of the second structural material ahead to thereby fill the inside of the room of the first shell, blocking the opening of the first shell with a third structural material having continuous pores and a shape like a flat plate, enclosing the third structural material with a plate member from the outside to seal the joint portion between the plate member and the first shell to thereby form a second shell which is fully closed, and evacuating the second shell. With this method, a heat insulation box body, in which the inside of the shell is kept in a vacuum and its external appearance is never deformed, can be obtained easily.

Preferably, a structural material to be brought into contact with an uneven surface of the shell is first inserted and a triangular sectional structural material having no uneven surface is finally inserted with a vertex portion thereof inserted ahead, so that the room of the first shell is filled with the structural materials. With this configuration, structural materials abut on the shell without any gap, so that tight wall surfaces can be obtained easily.

Preferably, evacuation of the second shell is performed under the condition that the inner and outer boxes and the structural materials put between the inner and outer boxes are not fixed by an adhesive agent, or the like. With this configuration, structural materials can be disposed of easily, so that working efficiency is improved and the adhesive agent which is a cause of lowering of the degree of vacuum in the shell can be eliminated to suppress loss of vacuum.

Preferably, at least one member of the first shell and the plate member for covering the opening of the first shell is bent at the joint portion to form a groove of a predetermined depth, the groove is filled with a liquid substance formed of an adhesive agent containing particles or powder of a metal oxide or a metal nitride, and after the other member is inserted into the groove filled with the liquid substance, the liquid substance is solidified while evacuating the fully closed second shell to thereby perform both joining and sealing at the joint portion. With this configuration, positioning can be made easily and the joint portion can be sealed securely.

According to a further aspect of the present invention, a method for disassembling a full vacuum heat insulation box body having a shell constituted by inner and outer boxes, and structural materials disposed in the shell, the inner and outer boxes and the structural materials being merely fixed by close-contact caused by means of a vacuum includes cutting a surface of the shell to thereby introduce air into the inside of the shell so as to allow the inside state of the shell to return to an atmospheric pressure state, then separating the materials of the shell and the structural materials from each other. With this method, the inner and outer boxes and structural materials can be separated from each other by a simple operation of destroying the vacuum state. Accordingly, respective members can be collected and recycled easily.

Preferably, a joint portion between the inner and outer boxes is constituted by a groove formed by bending an end edge portion of one member of the boxes inward in a zigzag and filled with a liquid substance, and an end side portion formed in the other member of the boxes so as to be able to be inserted into a deep portion of the groove. Also, preferably, cutting of the shell surface is performed by providing a notch in an outer surface of the one member having the zigzag bent portion along a position corresponding to the zigzag bent portion, and the inner and outer boxes are then separated from each other and the materials of the shell and the structural materials are recovered. With this configuration, as the cut portion of the shell is apart from a structural material is so as to have a gap between them, this portion can be cut easily without keeping cutting depth of the notch accurate and the shell can be opened. Accordingly, respective structural materials in the inside of the shell can be taken out, collected and recycled without damage.

Preferably, the outer box has an opening portion used for insertion of structural materials which is closed with a plate member, and a joint portion between the outer box and the plate member constituted by a groove formed by bending an end edge portion of one member of the outer box and the plate member inward in a zigzag and filled with a liquid substance, and an end side portion formed in the other member of them so as to be able to be inserted into a deep portion of the groove. Cutting of the shell surface is performed by providing a notch in an outer circumferential surface of the member having the zigzag bent portion along a position corresponding to the zigzag bent portion, and the outer box and the plate member are then separated from each other and the materials of the shell and the structural materials are recovered. With this configuration, since the cut portion of the shell is separate from a structural material so as to have a gap between them, this portion can be cut easily without keeping cutting depth of the notch accurate, and the shell can be opened. Accordingly, respective structural materials in the inside of the shell can be taken out, collected and recycled easily without damage.

DETAILED DESCRIPTION OF THE PREFERRED EMBODIMENT

Embodiment 1

Figure 1:
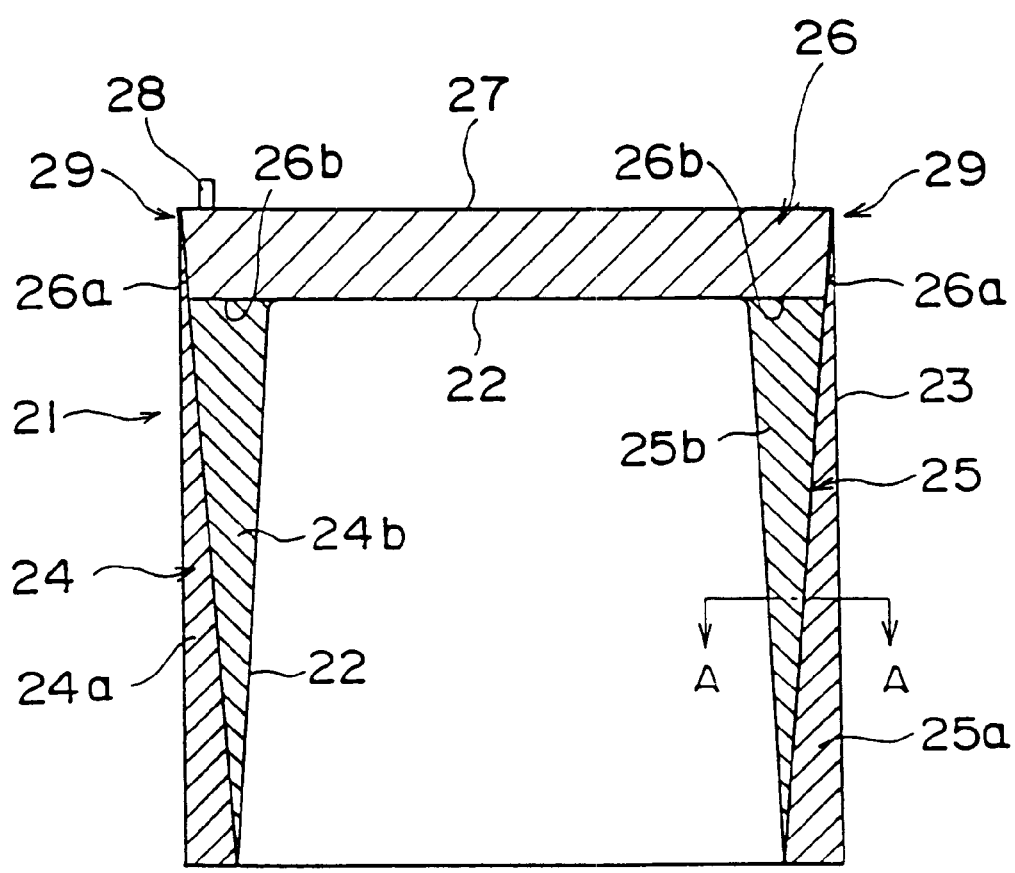
FIG. 1 is a sectional view showing a full vacuum heat insulation box body according to a first embodiment of the present invention in the state where the full vacuum heat insulation box body is laid on its side.

The present invention will be described below on the basis of an embodiment as shown in the drawings.

As shown in FIG. 1, the full vacuum heat insulation box body in this embodiment is applied to a chest freezer and so designed that inner and outer boxes 22 and 23 which constitute a shell 21 of the heat insulation box body and structural materials with continuous pores 24, 25, 26 and 35 which are interposed between the inner and outer boxes 22 and 23 and are preserved only by close contact based on a vacuum.

In more detail, a box-like member formed by stainless steel thin plates welded or jointed with bond is used herein as the inner box 22 constituting an interior surface of the shell 21. The material of this member is selected taking such conditions into consideration as suppression of lowering of heat insulating property caused by propagation of heat from the outer box 23 constituting an exterior surface of the shell 21, a gas barrier property for suppressing infiltration of external gas through inner box surfaces, and tolerance to shock caused by falling of various kinds of frozen and preserved food.

Further, a four-side bent member formed of a colored steel plate capable of bending is used herein as an outer box 23 constituting the exterior surface of the shell 21, preferably as a box-shaped member in which side wall surfaces are integrated. Incidentally, one of circumferential side surfaces (four surfaces) of each of the inner and outer boxes 22 and 23 is not shown in Figures for the sake of convenience in explanation.

Among the structural materials 24, 25, 26 and 35, structural materials 24, 25 and 35 inserted inside the respective side walls of the shell 21 are composed of parts 24a and 24b, 25a and 25b, and 35a and 35b, respectively, each of which exhibits a triangular sectional structure to produce a wedge effect. Among the parts 24a, 24b, 25a, 25b, 35a and 35b, the parts 24a, 25a and 35a disposed on the outer sides in the inside of the side walls are set to be longer than parts 24b, 25b and 35b disposed on the inner sides as shown in FIG. 1 so that the vertex ends of the outer parts 24a, 25a and 35a are protruded from the base ends of the inner parts 24b, 25b and 35b to the shell bottom surface side when the parts are assembled.

Further, a thickness of a rectangular flat plate-like structural material 26 finally inserted in the bottom wall portion of the shell 21 is so set that the structural material 26 is slightly protruded outward from the opening surface of the bottom wall. Furthermore, inclined surfaces 26a corresponding to the inclinations of the outer parts 24a, 25a and 35a of the side wall structural materials are formed in the circumferential surfaces of the structural material 26 so that the inclined surfaces 26a abut on the inner surfaces of the protruded portions of the outer parts 24a, 25a and 35a respectively. In addition, outer circumferential portions 26b of the inner surface of the structural material 26 are designed to abut on the base end surfaces of the inner parts 24b, 25b and 35b, respectively, of the side wall structural materials.

Each of these structural materials 24, 25, 26 and 35 is produced by cutting a large slab formed of a resin foam, such as urethane foam, or the like, having open cells. This is because, since the chest freezer is designed without an uneven portion in the surfaces of the inner and outer boxes 22 and 23, and the structural materials can abut on the inner and outer boxes 22 and 23 having simple shapes formed from planes, insertion of structural materials obtained by cutting a large slab formed of a resin foam, such as urethane foam, or the like, having open cells is inexpensive and materials having various adaptive properties, such as resistance against fragility enough to prevent generation of dust or the like in the case of rubbing of surfaces at the time of handling, strength enough to endure atmospheric pressure, moderate flexibility necessary for handling, excellent heat insulating property created on the basis of the shape of a fine cell effective for radiation heat insulation, the low density needed to suppress heat conduction in solid matters, etc. are secured easily.

Figure 2:
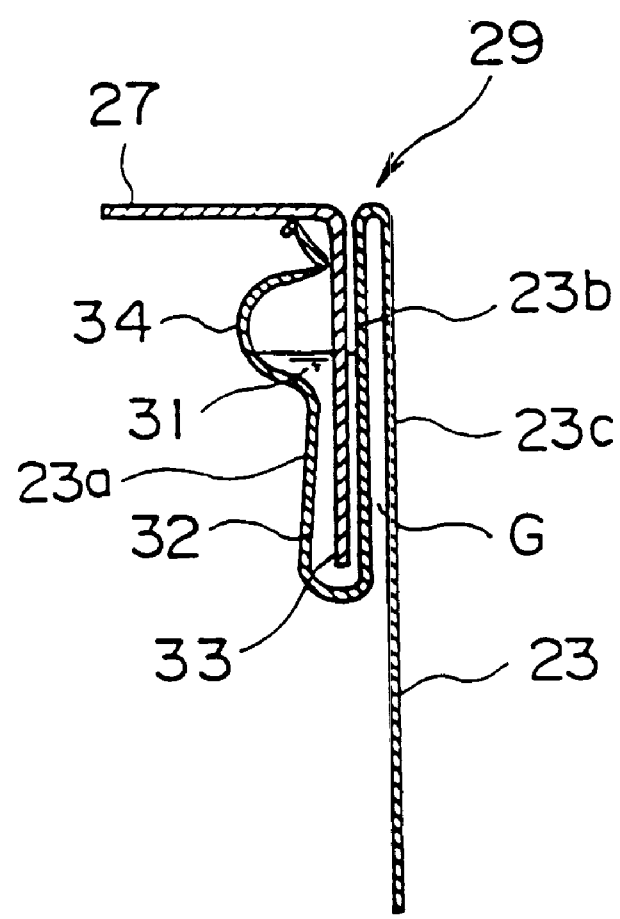
FIG. 2 is an enlarged sectional view showing a shell constituent member joint portion which is a main part of the full vacuum heat insulation box body according to the first embodiment.

Incidentally, the bottom surface portion of the shell 21 constituting a surface opposite to the opening portion of the chest freezer is opened initially so that the respective structural materials 24, 25, 26 and 35 can be inserted. After the respective structural materials 24, 25, 26 and 35 are inserted, the opening of the bottom surface is closed with a plate member 27 from the outside and the joint portion of the plate member 27 is sealed to thereby form a fully closed box body. Further, evacuation is performed through a vacuum valve 28 fitted to the plate member 27 by welding. As a result, the shell 21 constituted by the inner and outer boxes 22 and 23 and the plate member 27 comes into contact with the respective structural materials 24, 25, 26 and 35 interposed between the constituent members and the contact state is thus kept. In this occasion, a joint portion 29 between the outer box 23 and the plate member 27 is constituted by a groove 32 of a predetermined depth which is formed by bending an end edge portion of the outer box 23 inward in zigzag, as shown in FIG. 2, so that it is filled with a liquid adhesive agent 31 having a sealing function, and an end side portion 33 so formed in the plate member 27 that it can be inserted deeply into the groove 32. The outer box 23 and the plate member 27 are joined to each other at the joint portion 29 by use of mutual attraction force caused by negative pressure produced at the time of evacuation of the inside of the shell and this state is kept until the adhesive agent 31 in the groove 32 is hardened, so that the outer box 23 and the plate member 27 are joined and sealed. In this manner, the plate member 27 is made to operate as a piston by use of the negative pressure caused by the evacuation at the time of jointing, so that the structural material 26 disposed in the opening of the bottom surface can be pressed by the plate member 27 from the back surface side. Further, the inner parts 24b, 25b and 35b of the structural materials 24, 25 and 35 inserted in the side wall portion of the shell 21 are pressed by the pressed structural material 26, so that the wedge effect can be brought.

Incidentally, an adhesive agent comprising a mixture of a liquid resin such as an epoxy resin and ceramics containing metal oxide or metal nitride particles or powder is used as the adhesive agent 31. By this, contraction accompanying the effect of the resin constituting the adhesive agent 31 is suppressed to thereby prevent occurrence of defects of passing through the adhesive portion and prevent transmission of various kinds of gases.

A wide reservoir portion 34 for reserving the adhesive agent 31 is provided in the upper portion of the groove 32 by sheet bending as shown in FIG. 2, so that the adhesive agent 31 charged in the groove 32 is prevented from overflowing and leaking when the end side portion 33 of the plate member 27 is inserted. By this configuration, the end side portion 33 of the plate member 27 can be received in the groove 32 easily, so that the plate member 27 can be fixed to a fixed position of the outer box 23. Accordingly, the adhesive agent 31, which may be excessive but is never insufficient in quantity, can be charged, so that the sealing function for blocking entrance of the outside air is enhanced. That is, by immersing the joint portion between the outer box 23 and the plate member 27 in the resin charged in the groove 32, a fully sealed shell structure is obtained, so that defects such as incomplete joining and communicating portions, etc. can be eliminated. Incidentally, this joint structure is employed not only in the joint portion between the outer box 23 and the plate member 27 but also in a joint portion (not shown) between the inner and outer boxes 22 and 23. By this configuration, efficiency in joining work and the degree of sealing of the heat insulation box body as a whole can be enhanced, so that high reliability is obtained.

In this manner, the end edge portion of the outer box 23 is bent inward in a zigzag configuration to thereby form the groove 32, and an extreme end side piece 23a of the zigzag bent portion is bent so as to form the wide reservoir portion 34 for receiving the adhesive agent 31. Accordingly, as shown in FIG. 2, a gap G, which is continuous on the whole circumference of the joint portion 29, is formed between a base end side piece 23b of the zigzag bent portion and a portion 23c in the outer circumferential surface of the outer box 23 located opposite to the base end side piece 23b of the zigzag bent portion. This gap G is never fixed because the gap G is disposed outside the groove 32 and inside the shell 21 so that it is not filled with the adhesive agent 31. Accordingly, by cutting the zigzag bent portion on the outer circumferential surface of the outer box 23, that is, by cutting the portion 23c opposite to the base end side piece 23b at the time of disassembling, the air is introduced into the shell 21 so that the inside of the shell 21 can be returned to an atmospheric pressure state. The shell 21 can be thereby opened easily to take out the structural materials 24, 25, 26 and 35.

Figure 3:
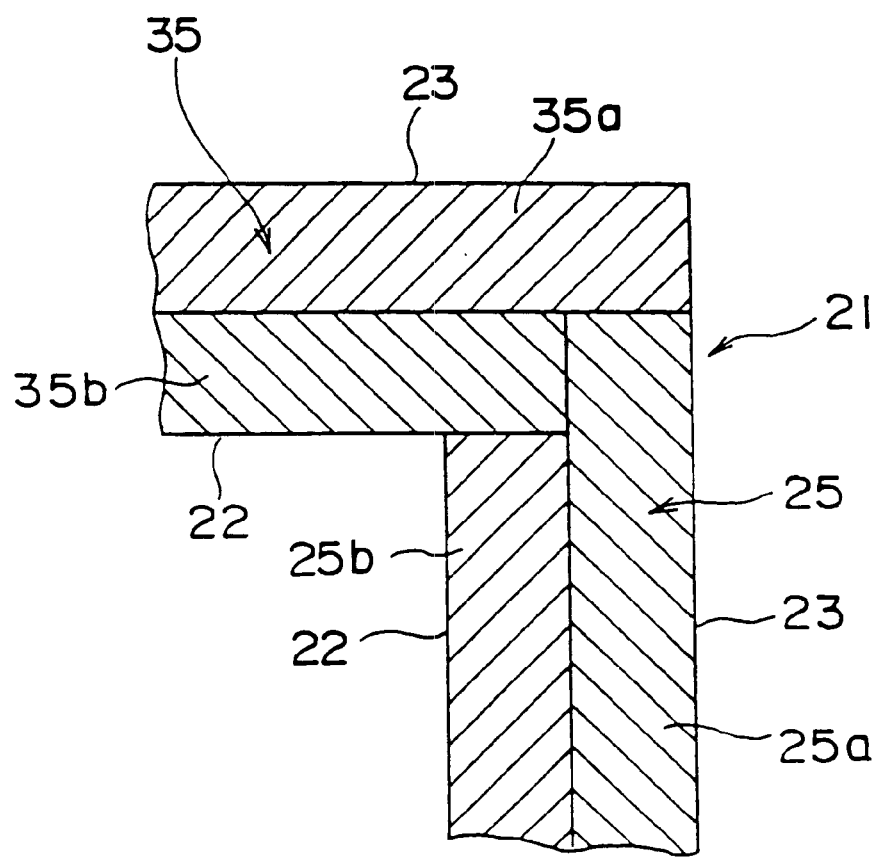
FIG. 3 is a sectional view taken along the line A—A in FIG. 1.

Further, as shown in FIG. 3, in each of the corner portions of the side walls, the cut shapes of the end edges of the structural materials including the taper of an adjacent triangular structural material are secured to make close contact to each other, and the end edges of the structural materials are combined in tiers and a labyrinthine form. In each of the corner portions of the side walls, adjacent structural materials can be thereby made to contact closely to each other, so that the quantity of leaking heat can be greatly reduced even on condition that of the same gap size is formed in butting.

Figure 4:
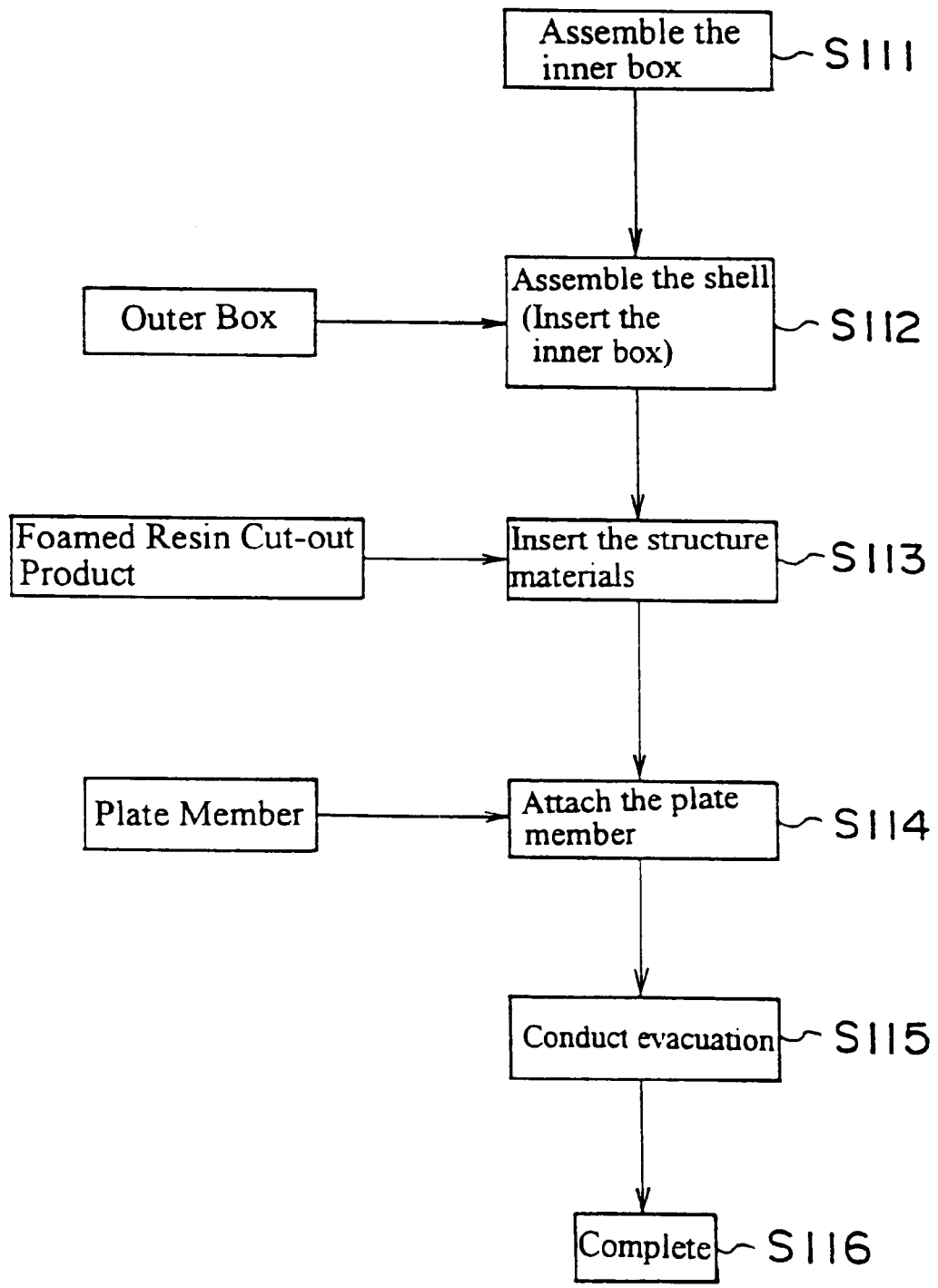
FIG. 4 is a flow chart showing a method for producing the full vacuum heat insulation box body according to the first embodiment.

A method for producing a full vacuum heat insulation box body configured as described above will be described below on the basis of the flow chart of FIG. 4 with reference to FIGS. 1 through 3. First, stainless steel thin plates are joined by means of welding or adhesive bonding so as to be shaped like a box to thereby obtain an inner box 22 constituting an interior surface of a shell of the heat insulation box body (step 111).

Then, a colored steel plate is bent to form a 4-side pipe-like bent member to thereby obtain an outer box 23 constituting an exterior surface of the shell of the heat insulation box body. After the inner box 22 is inserted in the outer box 23, the inner and outer boxes 22 and 23 are joined to each other in the joint portions to thereby form a first shell in which the bottom surface of the outer box is opened (step 112). With respect to the work of joining the outer and inner boxes 23 and 22, the mode of the joint portions is the same as in the joint portion between the outer box 23 and the plate member 27 explained in FIG. 2. A groove provided in one of the outer and inner boxes 23 and 22 is filled with an adhesive agent composed as described above. After an end side portion provided in the other box is inserted in the groove filled with the adhesive agent, this state is kept until the adhesive agent in the groove is hardened. Thus, both joining and sealing between the outer and inner boxes 23 and 22 are performed. In this occasion, the groove can be entirely filled with the adhesive agent if a larger amount of the adhesive agent is provided near the center of each groove so that the adhesive agent is made to flow by inserting the end side portion of the other box. This is preferable from the point of view of obtaining uniform and faultless sealing. As described above, into the resin in the groove formed in one of the outer and inner boxes 23 and 22 at the joint portion therebetween, the end side portion provided in the other box is immersed to thereby make it possible to eliminate defects such as incomplete joined portions and communicating portions, etc. Thus, a shell structure in which the joint portion is fully sealed is obtained. As a result, the defect portion such as a hole passing through the shell, etc. is reduced to secure a sealing structure having an excellent reliability in blocking gas such as air, water vapor, etc. entering the heat insulation box body from the outside.

Then, a structural material for making the shell endure atmospheric pressure so as not to be deformed at the time of evacuation in the posterior stage, is prepared and inserted in the first shell (step 113). The preparation of the structural material is as follows. First, a foaming resin such as foaming urethane, or the like, having open cells is foamed to thereby prepare a large slab-like foamed article. The foamed article is cut to obtain first, second and third structural materials, that is, parts 24a, 25a and 35a which are first structural materials each exhibiting a triangular sectional structure, parts 24b, 25b and 35b which are second structural materials each exhibiting a triangular sectional structure, and a structural material 26 which is a third structural material shaped like a flat plate inserted in the bottom wall portion. The structural materials thus obtained are inserted in gaps between the outer and inner boxes 23 and 22 through the opening of the first shell.

Insertion of the structural materials into the first shell is carried out as follows. First, the first structural materials each having a triangular section, that is, parts 24a, 25a and 35a are inserted in the inside of respective side walls (4 sides) through the opening of the first shell so as to be preceded by end sides which are respective base portions of the triangles. Then, the second structural materials each having a triangular section, that is, parts 24b, 25b and 35b are inserted in the side walls (4 sides) through the opening of the first shell so as to be preceded by vertex portions of the triangles. By this configuration, the inside of the circumferential side walls of the first shell is filled. Then, the opening of the first shell is blocked by the third structural material 26 shaped like a flat plate.

When insertion of all the structural materials into the first shell is completed, the third structural material 26 is enclosed by the plate member 27 from the outside to seal the joint portion between the plate member 27 and the first shell with the adhesive agent 31 to thereby form a fully closed second shell (step 114). The second shell is evacuated through the vacuum valve 28 attached to the plate member 27 (step 115).

The evacuation is started under the condition that the structural materials 24, 25, 26 and 35 put between the inner and outer boxes 22 and 23 are not fixed by means of an adhesive agent, or the like, and before the adhesive agent 31 in the groove 32 in the joint portion 29 between the outer box 23 and the plate member 27 is hardened. The evacuation is continued until the adhesive agent 31 is hardened. Accordingly, when the evacuation is started, the plate member 27 is pulled toward the inside of the second shell on the basis of the pressure difference between the air pressure of the inside of the second shell and the air pressure of the outside thereof. As a result, the plate member 27 functions as a piston for pressing the third structural material 26 from the bottom surface side. The structural materials 24, 25 and 35 inserted in the circumferential side wall portions of the shell 21, especially parts 24b, 25b and 35b as the second structural materials are pressed by the third structural material 26 pressed by the plate member 27, so that the wedge effect acts. As a result, there is no slack in the direction of the thickness of each wall. so that the shell can be substantially entirely filled without any gap. Accordingly, even in the case where the inside of the shell reaches a vacuum state. the shell is never deformed, i.e., cavitated, by the atmospheric pressure. Thus, an excellent external appearance state can be kept. After the adhesive agent 31 is hardened, the inner and outer boxes 22 and 23 and the respective structural materials 24, 25, 26 and 35 are kept only by close contact based on a vacuum to thereby obtain a full vacuum heat insulation box body which is light in weight and has a uniform strength characteristic (step 116). Although the degree of vacuum in the shell varies in accordance with the kinds of the structural materials used, sufficient heat insulating property can be provided by keeping the degree of vacuum higher than $10°$ torr, preferably higher than $10°$ torr.

In this manner, the inner and outer boxes 22 and 23 and the respective structural materials 24, 25, 26 and 35 are brought into close contact with one another by use of the negative pressure based on a vacuum without use of any adhesive agent. Accordingly, the problem of vaporization, scattering, etc. of water and low-molecular substances contained in the adhesive agent material, into the shell under a vacuum state brought about by use of some adhesive agent is eliminated, so that degradation of heat insulating property is prevented. Further, although the respective structural materials 24, 25, 26 and 35 are not stuck to the shell, they fill gaps in the shell. Accordingly, their recomotion, or the like, is not caused by vibration in handling in production and use and these arises no problem that the external appearance is spoiled.

Furthermore, recovery at the time of recycling is simplified. That is, in the case of a conventional heat insulation box body such as a refrigerator, or the like, closed-cell urethane foam as a structural material is firmly stuck to an ABS resin vacuum-molding and a bent article of a coated steel plate which are shell materials. Accordingly, in the conventional case, a great deal of labor is required for separating these materials from each other and the urethane foam cannot be entirely removed even if these materials are separated. In the full vacuum heat insulation box body according to the present invention, however, the shell and the structural materials are fixed to one another in a state where they are merely pressed by the atmospheric pressure so as to be in close-contact with each other. Accordingly, if the vacuum state is broken, the inner and outer boxes 22 and 23 and the respective structural materials 24, 25, 26 and 35 can be peeled off and separated easily.

Figure 5:
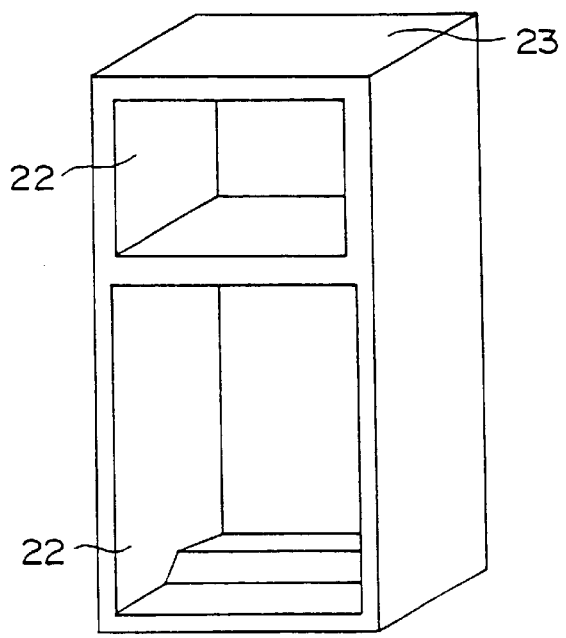
FIG. 5 is a perspective view showing a refrigerator using the full vacuum heat insulation box body according to the first embodiment in the state where a door portion is removed.

FIG. 5 shows a refrigerator produced by the same method as used for producing the aforementioned chest freezer. In the case of the chest freezer, an opening for insertion of the respective structural materials is provided in the bottom surface, whereas in the case of this refrigerator, an opening initially formed for insertion of the structural materials in the inside of the opposite side walls, a ceiling, a floor and a middle wall of the refrigerator is set on the back surface. According to this structure, structural material parts of a triangular sectional structure inserted in the upper, lower, left, right and middle walls are pressed at the time of evacuation by a rectangular flat plate-like structural material finally inserted in the back surface portion and a plate member for enclosing the rectangular flat plate-like structural material, so that the wedge effect can be brought about. As a result, no slack or cavitation is caused in the direction of the thickness of each wall, so that the shell can be substantially entirely filled without any gap. Accordingly, the shell is never deformed even if the inside of the shell reaches a vacuum state. Thus, a refrigerator having its external appearance kept excellent is obtained. Incidentally, it is a matter of course that the evacuation is performed at the time of jointing the joint portion between the outer box 23 and a back plate member (not shown) in a state where the refrigerator is laid on its side, and that the evacuation is started before hardening of the adhesive agent in the groove in the joint portion and continued until the adhesive agent is hardened.

When the present invention is applied to a large-scale full vacuum heat insulation box body such as a refrigerator, or the like, as described above, the inner and outer boxes 22 and 23 and the respective structural materials can be peeled and separated from one another easily so that efficiency in recovery at the time of scrapping can be enhanced greatly. That is, in the conventional heat insulation box body such as a refrigerator, or the like, closed-cell urethane foam as a structural material is firmly stuck to an ABS resin vacuum-molding and a bent article of a coated steel plate as shell materials Accordingly, in the conventional case, a great deal of labor is required for separating these materials from each other and urethane foam cannot be entirely removed even if these materials are separated. In the full vacuum heat insulation box body according to the present embodiment, however, the shell and the structural materials are fixed to one another in a state where they are merely pressed by the atmospheric pressure so as to be in close-contact with each other. Accordingly, when the vacuum state is broken, they can be peeled off and separated easily.

Embodiment 2

Figure 6:
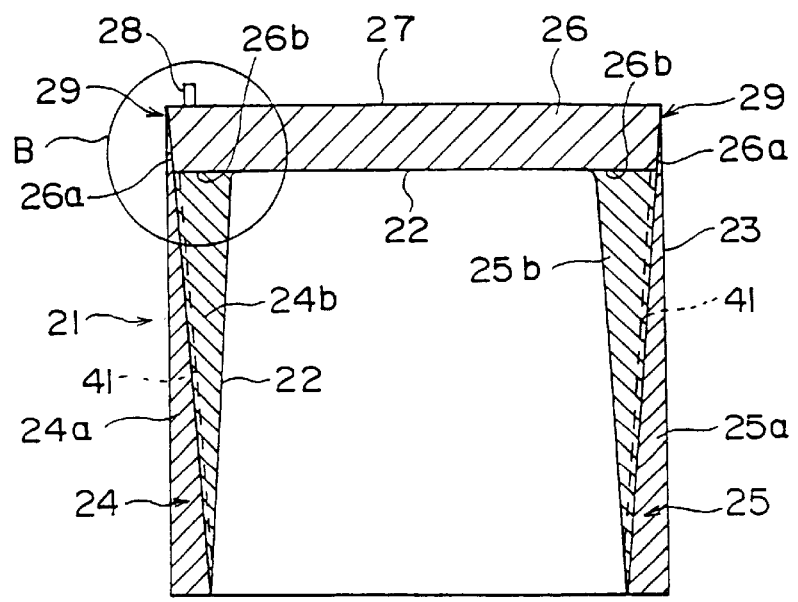
FIG. 6 is a sectional view showing a full vacuum heat insulation box body according to a second embodiment of the present invention in the state where the full vacuum heat insulation box body is laid on its side.
Figure 7:
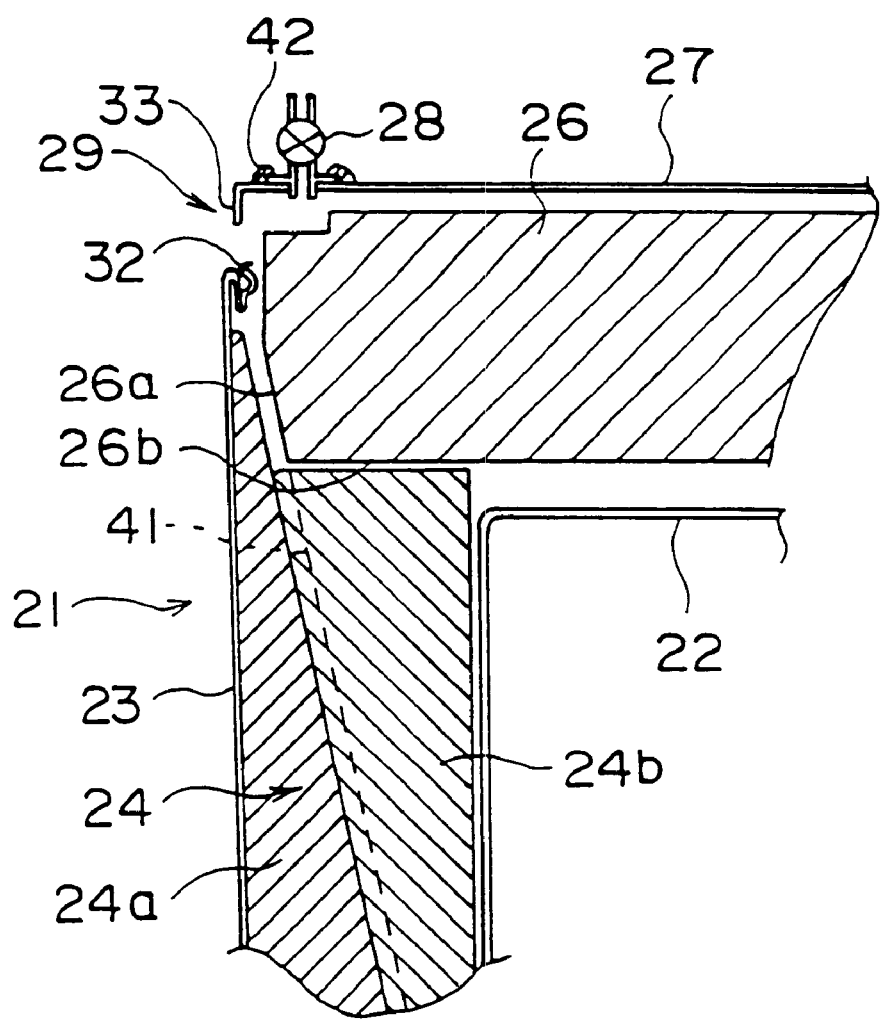
FIG. 7 is an enlarged sectional view showing the portion B in FIG. 6 before joining.
Figure 8:
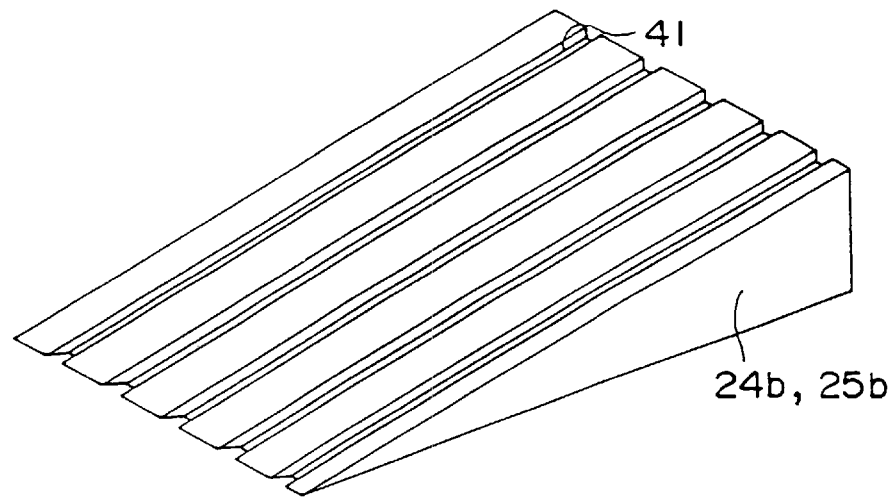
FIG. 8 is a perspective view showing the whole of a grooved structural material in the full vacuum heat insulation box body according to the second embodiment.

Referring now to FIG. 6 through FIG. 8, with respect to the inside of the circumferential side walls, only left and right walls are shown and explained.

In this embodiment, the full vacuum heat insulation box body is applied to a chest freezer. Parts of structural materials 24 and 25 inserted in side walls of a shell 21 constituted by outer and inner boxes 23 and 22 and a plate member 27, that is, parts 24a, 24b, 25a and 25b each produced by cutting a large slab-like foamed article formed from a foaming resin such as foaming urethane, or the like, having open cells and exhibiting a triangular sectional structure are so designed that a plurality of grooves 41 extending in the lengthwise direction as shown in FIG. 8 are provided in parallel on an inclined surfaces of either one of the inner part 24a and the outer part 24b, or 25a and 25b. The grooves are herein provided on the inclined surfaces of the inner parts 24b and 25b disposed on the inner box 22 side in this embodiment. The inner parts 24b and 25b are combined with the outer parts 24a and 25a disposed on the outer box 23 side so that the surfaces of the inner parts 24b and 25b having the grooves 41 formed thereon come face to face with the surfaces of the outer parts 24a and 25a. Although the labyrinthine structure of the side edge portions of the structural materials 24 and 25 is not shown, it is a matter of course that adjacent structural materials are combined with each other in tiers at each of the corner portions of the side walls.

In more detail, because wide grooves 41 in the parts 24b and 25b are easily deformed by atmospheric pressure, it is preferable to provide a large number of grooves each of which is rather narrow and deep to an extent not to constitute an obstacle in handling. Here is shown the case where grooves each having a width of 3 mm and a depth of 5 mm are provided at intervals of a pitch of 50 mm. The other conditions such as the configuration of the joint portion between the outer and inner boxes 23 and 22 and the procedure of assembling the respective members are the same as in the first embodiment described previously.

Also in this embodiment, by performing evacuation through a vacuum valve 28 attached to the plate member 27 by means of welding 42, the wedge effect of the parts 24b and 25b each having a triangular section is brought so that the shell 21 constituted by the inner and outer boxes 22 and 23 and the plate member 27 is brought into close contact with the structural materials 24, 25 and 26 put therebetween and that the close contact state is kept. In this occasion, it is necessary that the gasses in a portion located farthest from the vacuum valve 28 (gasses adsorbed on the surface of the shell or remaining in pores of the structural materials) are also sucked and exhausted through the vacuum valve 28. In this embodiment, as the grooves 41 serving as gas exhaust passages are present on the mating surface between the triangular sectional parts of the structural materials 24 and 25 inserted in the inside of the respective side walls, gasses, or the like, in pores of the respective structural materials are exhausted through the grooves 41 after moved into the grooves 41. Accordingly, efficiency evacuation is enhanced so that a sufficient vacuum state can be secured up to the inside of continuous pores of the structural materials located opposite to the vacuum valve 28.

For example, in the case of the heat insulation box body of a refrigerator having an internal volume of 400 L, a distance not smaller than 1 m is required as the distance from a position of evacuation to the farthest end of the structural materials even if evacuation is performed from any position. Accordingly, a long time is required to exhaust gasses such as air, etc. remaining in pores of the structural materials located at far ends, only through the pores of the structural materials. According to this embodiment with gas-exhaust grooves 41 on the contrary, gasses can be exhausted to the outside of the shell easily after they are moved into the gas-exhaust grooves 41 so that the time required for exhausting gasses is shortened greatly.

Embodiment 3

In the full vacuum heat insulation box body according to this embodiment, the present invention is applied to the same chest freezer as in the first embodiment. Among the structural materials 24, 25, 26 and 35 inserted in the inside of the shell 21 constituted by the outer and inner boxes 23 and 22 and the plate member 27 in FIG. 1, at least parts 24a, 24b, 25a, 25b, 35a and 35b exhibiting a triangular sectional structure are formed of polystyrene foam having open cells. Incidentally, FIGS. 1, 2, 3 and 7 explained previously are referred to in the following description.

In this embodiment, a resin foam having open cells is used as a material for the structural materials 24, 25, 26 and 35. As a material, polystyrene foam having small cell size are used as well as urethane foam. With respect to a method for producing polystyrene foam having open cells, as described in W096/07942 (JP-A-8-503720, Japanese Patent Application No. Hei-6-509062) and WO96/16876 (JP-A-8-505895, Japanese Patent Application No. Hei-6-517001), first, polystyrene having a mean molecular weight of $2 \times 10^5$ is subjected to extrusion mixing, foaming and quenching by suitable use of carbon dioxide gas which is a main foaming agent, and an auxiliary foaming agent such as HFC-134a (1,1,1,2-tetrafluoroethane), HFC-152a (1,1-difluoroethane), etc., so that polystyrene foam having the open cell content near to 100% and a small cell size.

In this occasion, the cells can be flattened easily by addition of compression stress so as to be spread in a direction perpendicular to the direction of thickness because the temperature of the inside of the obtained extrusion molding having the open cells is kept sufficiently in a value lower than the melting point and higher than the heat deformation point. In order to remove the stress produced in the resin which is involved in flattening of the cells, the temperature is kept in the compressed state to perform annealing and then the molding is cooled to a temperature lower than the heat deformation point, preferably lower than the glass transition point. Among the structural materials 24, 25, 26 and 35, structural materials 24, 25 and 35 inserted in the inside of the respective side walls of the shell 21 are cut out from the thus obtained molding block into a triangular sectional structure which brings about the wedge effect. Further, in the structural materials 24, 25 and 35, parts 24a, 25a and 35a disposed on the outer side inside the side walls are so cut out as to be longer than inner parts 24b, 25b and 35b as shown in FIG. 1 so that the vertex side ends of the parts 24a, 25a and 35a are protruded toward the bottom surface side of the shell from the base sides of the inner parts 24b, 25b and 35b respectively at the time of assembling. Thus, processed parts each having a desired size and a desired shape are obtained.

Incidentally, the process of flattening cells may be performed after the parts 24a, 24b, 25a, 25b, 35a and 35b each exhibiting a triangular sectional structure are cut out from the extrusion molding block. That is, there may be used a method in which, after processed parts each having a desired size and a desired shape are obtained from the block-like extrusion molding block, the processed parts are pressed so that cells are flattened so as to be spread in a direction perpendicular to the direction of the thickness, and then the processed parts are annealed if necessary.

With respect to the processed parts of polystyrene foam having open cells, dust, or the like, is hardly produced even if the surface of polystyrene foam is rubbed in handling, and polystyrene foam is excellent both in strength tolerant to atmospheric pressure and in moderate flexibility necessary for handling, compared with urethane foam having open cells as used in the aforementioned first and second embodiments. Furthermore, not only the shape of a fine cell effective for radiation heat insulation is provided but also an effect of blocking off radiation heat in the heat insulating direction is enhanced by processing cells flatly so as to be spread in a direction perpendicular to the direction of the thickness. Accordingly, the processed parts of polystyrene foam have various adaptive properties such as excellent heat insulating property, etc. brought by these effects.

The thus obtained processed parts of polystyrene foam having open cells are put between the inner box 99 which is formed like a box of stainless steel thin plates and which constitutes an interior surface, and the outer box 23 which is formed as a 4-side bent article of a colored steel plate and which constitutes an exterior surface. Then, a rectangular flat plate-like structural material 26 which has such a thickness that the material 26 is slightly protruded outward from the opening surface of the bottom portion of the shell 21 and which has inclined circumferential surfaces 26a corresponding to inclined surfaces of the outer parts 24a, 25a and 35a of the side wall structural materials is inserted in the bottom wall portion of the shell 21 so that the inclined circumferential surfaces 26a are made to abut on the inner surfaces of the protrusion portions of the outer parts 24a, 25a and 35a, and further, outer circumferential portions 26b of the inner surface of the structural material 26 are made to abut on the base end surfaces of the inner parts 24b, 25b and 35b of the side wall structural materials. Further, the end side portions 33 of the plate member 27 covering the bottom wall are inserted in and engaged with the grooves 32 of a predetermined depth formed by bending the end edge portions of the outer box 23 inward in zigzag as shown in FIG. 2 and filled with the adhesive agent 31 of a liquid matter having an adhesive sealing function.

Then, evacuation is performed through the vacuum valve 28 attached to the plate member 27 by means of welding, so that the shell 21 constituted by the inner and outer boxes 22 and 23 and the plate member 27 is brought in close contact with the respective structural materials 24,25,26 and 35 inserted therebetween. At the same time, the outer box 23 and the plate member 27 are strongly engaged with each other at the joint portion 29 by use of mutual attraction force based on negative pressure produced at the time of evacuation of the inside of the shell, and this state is kept until the adhesive agent 31 in the grooves 32 has hardened, so that jointing and sealing between the outer box 23 and the plate member 27 are performed. Although the labyrinthine structure of the side edge portions of the structural materials 24 and 25 is not shown here, it is a matter of course that adjacent structural materials are combined with each other in tiers at each of the corner portions of the side walls.

Results of evaluation of heat insulating property based on the quantity of leaking heat and design characteristic based on the smoothness of the wall surface of the shell in comparison between test examples 1, 2 and 3 and comparative examples 1 and 2 will be described below in order to confirm the heat insulating effect of the full vacuum heat insulation box body according to the aforementioned first, second and third embodiments.

TEST EXAMPLES 1, 2 AND 3

For the use of a chest freezer having an internal volume of 280 L, the following test examples 1 through 3 were prepared by the producing method explained in the first embodiment. That is, a full vacuum heat insulation box body (test example 1) according to the first embodiment was formed by using structural materials with no gas-exhaust groove which were formed by cutting a slab of urethane foam having open cells and processing the cut out pieces; another full vacuum heat insulation box body (test example 2) according to the second embodiment was formed by using structural materials which were formed by providing each structural material according to the test example 1 with grooves each having a width of 3 mm and a depth of 5 mm, arranged at intervals of a pitch of 50 mm; and a further full vacuum heat insulation box body (test example 3) according to the third embodiment was formed by using structural materials formed through steps of pressing a slab of polystyrene foam having open cells so as to make the cells flat to spread in a direction perpendicular to the direction of the thickness, annealing the slab if necessary, and cutting pieces out of the slab and processing them.

Comparative Example 1

The shell obtained by the method of fitting the shell materials and the respective parts explained in the first embodiment was attached to a jig in a state where the opening portion of the shell which is a surface opposite to the opening portion of the inner box was placed upward so that the shell was not deformed by foaming pressure of foaming urethane. Then, raw materials of two-part foaming urethane containing cyclopentane as a foaming agent were discharged while mixed by use of a mixer of a high-pressure foaming machine so that the raw materials were injected into the shell in a direction along the bottom surface from an injection hole located in a machine chamber in the body portion of the chest freezer. Then, the hole used for injection was sealed immediately so that foaming urethane did not leak. When a reaction of the two-part raw materials was started, the mixture solution flew in the form of produced bubbles while being foamed on the basis of vaporization of cyclopentane caused by reaction heat of a resinification reaction and generation of carbon dioxide gas as a byproduct of the resinification reaction. As a result, gaps in the shell were filled with the mixture solution. After the shell was left for 5 minutes during which hardening of the mixture solution was completed, the shell was taken out from the jig. Thus, there was obtained a heat insulation box body filled with closed cells in this comparative example 1.

Comparative Example 2

Two-part foaming urethane having open cells was injected into the shell in the same manner as in the comparative example 1 so that the shell was filled with the foaming urethane. After hardening was completed, the shell was taken out from the jig to thereby obtain a heat insulation box body in this comparative example 2. Incidentally, in the comparative example 2, a vacuum cock was provided in a machine chamber located in its bottom portion and for receiving a compressor, etc.

The content of evaluation is as follows.
(1) Heat Insulating Property

The quantity of leaking heat and the change thereof with the passage of time were evaluated.

The quantity of leaking heat was obtained on the basis of electric energy which was given when the inside of a chest freezer equipped with a heater of known heating power in its center portion was kept at an arbitrary temperature in the condition that the chest freezer was put in an thermostatic chamber kept at another arbitrary temperature.

In this occasion, the chest freezer was put in an thermostatic chamber at 20° C. in order to secure 50° C. as the temperature difference between the inside of the freezer and the outside of the freezer in an actual use state, and in this state, electric energy given to the heater was adjusted and stabilized so that the temperature of the inside of the freezer is kept to 30° C. The quantity of given heat was calculated on the basis of given electric energy per unit time and used as the quantity of leaking heat.

Incidentally, a chest freezer produced herein was used when the time longer than 48 hours was passed after the completion of evacuation. A door having a heat insulation layer filled with closed-cell urethane foam was used for the opening portion of the chest freezer in common to the test examples 1 and 2 and the comparative examples 1 and 2.
(2) Efficiency in Evacuation The time required from the start of evacuation by use of a vacuum pump having a gas-exhaust capacity of 1500 L/min to the end when a vacuum value of 0.05 torr is confirmed by use of a Pirani vacuum gauge disposed in a portion of a vacuum cock, was measured. After the heat insulation box body was held for 60 seconds after the confirmation of this value, the vacuum cock was closed so that air, or the like, did not enter the heat insulation box body from the outside. Thus, the evacuation of the heat insulation box body was completed.

The degree of vacuum after 2 hours and the degree of vacuum after 48 hours from the completion of the evacuation of the heat insulation box body were measured by use of the Pirani vacuum gauge.

Efficiency in evacuation was evaluated on the basis of the time required for evacuation and the quantity of reduction of the degree of vacuum.
(3) Design Characteristic in External Appearance A result of comparison of smoothness in external appearance by eye observation was evaluated as design characteristic in external appearance so as to be classified into five-stage levels based on the comparative example 1 representing a conventional product.

Results of the items (1) to (3) are shown in the following Table 1.

TABLE 1

| | Test Ex. 1 | Test Ex. 2 | Test Ex. 3 | Comp. Ex 1 | Comp. Ex. 2 |
|---|---|---|---|---|---|
| Quantity of Leaking Heat (kcal/h) | 30.6 | 31.0 | 27.3 | 47.7 | 38.5 |
| Vacuum Reaching Time (sec) | 162 | 152 | 172 | — | 282 |
| Chang of Degree of Vacuum with the Passage of Time (torr) | | | | | |
| 2 hours | 0.06 | 0.06 | 0.11 | — | 0.47 |
| 48 hours | 0.08 | 0.07 | 0.13 | — | 1.06 |
| Smoothness of Outer Box | 4 | 4 | 4 | 3 | 2 |

Smoothness of External Appearance:
4 = slightly good,
3 = even level,
2 = slightly bad (with no problem in practical use)

As was apparent from results of Table 1, it could be confirmed that all the test examples 1, 2 and 3 had remarkably excellent heat insulating property compared with the comparative example 1 showing a conventional heat insulation box body using closed-cell urethane foam made with cyclopentane as a foaming agent.

Further, the heat insulating property in all the test examples 1, 2 and 3 was enhanced compared with a heat insulation box body filled with open cell foaming urethane directly injected as shown in the comparative Example 1.

As a factor thereof, the evacuation time is shortened and the quantity of gas remaining in the inside of the shell is small after the completion of evacuation, because structural materials cut off from a slab of foamed article are used in the present invention. This fact was confirmed from the degree of vacuum kept high and the small quantity of leaking heat providing excellent heat insulating property.

Particularly with respect to the test example 3, reduction in the quantity of leaking heat was achieved with remarkable enhancement of heat insulating property. It is believed that the enhanced insulation ability is due to the effect obtained by use of open cell polystyrene foam and by flattening the shape of each cell so as to spread the cell in a direction perpendicular to the direction of the thickness.

Further, it was found that the smoothness of the outer box in the comparative example 2 using open cell urethane foam as a structural material was slightly lowered compared with the comparative example 1 representing a conventional heat insulation box body filled with closed-cell urethane foam without use of vacuum heat insulation so that the comparative example 2 was inferior to the comparative example 1 in external appearance design characteristic.

On the contrary, the test examples 1, 2 and 3 according to the present invention were not inferior in external appearance design characteristic to the comparative example 1 representing a conventional product, so that the test examples 1, 2 and 3 could obtain good results.

External appearance design characteristic greatly depends on the uniformity of the heat insulating material packed in the inside of the shell. Accordingly, in the case of a large-size refrigerator, the flowing distance of foaming urethane becomes very long. Accordingly, in the case of comparative examples, a large difference in the shape of flowing bubbles is generated between the start point of foaming and the finally filled portion and, further, flowing bubbles tend to be combined with one another to change the flow of the bubbles. As a result, mechanical properties such as compression strength, etc. vary widely in accordance with the respective portions. That is, non-uniform contraction is created because of the fact that the inside temperature raised up to about 120° C. by a exothermic reaction and is cooled to the room temperature after the completion of foaming, or because of the difference of the environmental temperature of use, or the like.

The fluidity of bubbles in foaming of open cell foaming urethane is further inferior to that in closed-cell foaming urethane. Accordingly, in foaming of open cell foaming urethane, the aforementioned disadvantage occurs easily and closed cells are apt to remain in the vicinity of the wall surface of the shell where shearing stress caused by the flowing of the bubbles is not applied to the bubbles so that the closed cells which are apt to be deformed due to a change of the temperature are distributed ununiformly. It is considered that this is a factor which tends to degrade the external appearance design characteristic.

On the contrary, in structural materials used in the full vacuum heat insulation box body, the slab of foamed article is so configured that a foaming urethane mixture solution applied uniformly is foamed only upward. Accordingly, the physical property distribution is quite uniform, and moreover, it is possible to cut structural materials selectively from a portion near the center of the slab where most of the pores are communicated with one another, so that deformation hardly occurs in the structural materials.

Further, in open cell urethane foam packed in the heat insulation box body, foaming gas remains in the inside as it is, and remaining of unreacted components, adsorption of the foaming gas onto the resin, etc. occur frequently.

On the contrary, in the case of a slab of urethane foam, foaming is performed in an opened state and structural materials are cut selectively from a portion near the center where most of the pores are communicated with one another. Accordingly, it is unnecessary to keep a state where an excessive amount of foaming gas remains in pores so as to be adsorbed easily. Furthermore, on a single structural material cut out, processes such as heating, drying under a vacuum state, etc. can be carried out easily, so that extremely stable physical properties can be obtained and the quantity of gas produced from the structural materials can be suppressed in a state where the inside of the heat insulation box body is in a vacuum. Accordingly, degradation of heat insulating property depending on the degree of vacuum is further suppressed so that reliability against vacuum loss from the inside over time can be enhanced and the operating time of an evacuator used for maintaining vacuum can be shortened. As a result, more power saving is attained in the chest freezer using this heat insulation box body.

Here, a notable result is obtained in comparison between the test examples 1 and 2. That is, though both full vacuum heat insulation box bodies exhibit good heat insulating property and are sufficiently effective compared with the comparative examples 1 and 2, it is found that, in the case of the test example 2 using the structural materials provided with gas-exhaust grooves, the grooves do not affect its external appearance design characteristic and that the time required for evacuation is shortened to thereby enhance easiness of evacuation.

Embodiment 4

Referring now to FIGS. 9–12, the inside of the circumferential side walls will be explained by illustrating only the right walls.

The full vacuum heat insulation box body in this embodiment is applied to a refrigerator. The inner box 22 having an uneven shape 22a on its surface and constituting an interior surface of the shell 21 is formed in such a manner that a complex sheet material constituted by polystyrene resin containing butadiene rubber as a middle layer, acrylonitrile, which has an excellent gas barrier property as an upper layer and polypropylene as a lower layer is prepared, silicon is also deposited on the surface of the upper layer, and the thus obtained sheet is molded in a vacuum into the inner box 21.

Figure 10:
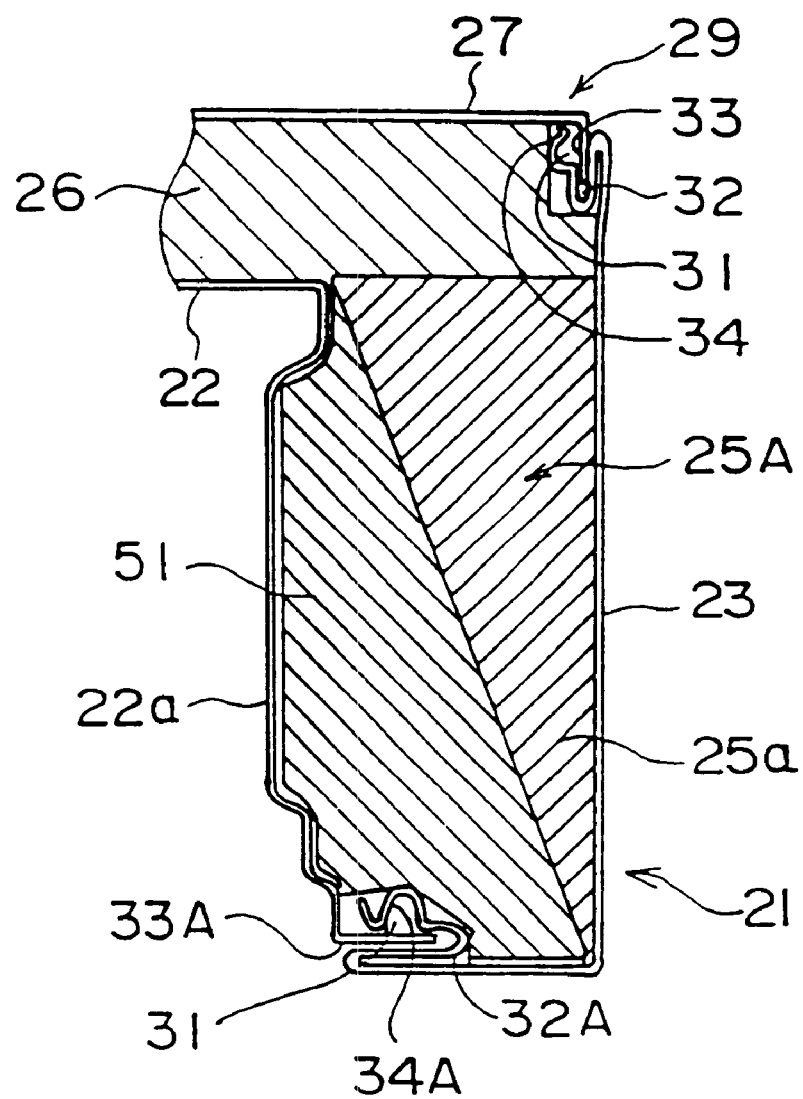
FIG. 10 is an explanatory view showing a section taken along the line C—C in FIG. 9.

Further, the outer box 23 constituting an exterior surface of the shell 21 is formed of a bent member which is a colored steel plate shaped in the form of a hollow box integrating a ceiling, a floor and opposite sides. An end side portion 33A of the inner box 22 is inserted into a groove 32A which is formed by bending an end edge portion of the outer box 23 inward and in a zigzag configuration, as shown in FIG. 10, so that the groove 32A has a predetermined depth and is filled with an adhesive agent 31 of a liquid substance having an adhesive sealing function. Thus, the outer box 23 and the inner box 22 are joined to each other. The configuration of the joint portion including the adhesive agent 31 is the same as the joint portion between the plate member 27 and the outer box 23 as described previously in the first embodiment with reference to FIG. 2. A wide reservoir portion 34A for reserving the adhesive agent 31 is provided in the upper portion of the groove 32A.

A structural material 25A to be inserted in the inside of each of the opposite side walls, ceiling, floor and a middle wall in the shell 21 is constituted by two parts 25a and 51. Among these parts, the part 25a having a simple shape constituted by planes is inserted in a smooth surface portion of the shell 21, that is, a portion on the outer box 23 side in the ceiling, floor and middle wall and opposite side walls. The part 25a exhibiting a triangular sectional structure is cut out from a large slab of foamed article obtained by foaming, a foaming resin such as foaming urethane, or the like, having open cells. Further, the part 51 to be inserted in the shell on the side of the inner box 22 having an uneven surface shape 22a for shelf rests, cooled air circulating grooves, etc. also exhibits a triangular sectional structure basically. However, if the part 51 is formed, for example, of a simple plate-like structural material, the structural material does not fully abut on the uneven-shape portions such as shelf rests, etc., so that the uneven-shape portions may be deformed by the atmospheric pressure when the shell is evacuated. Therefore, the structural material part 51 which can fully abut on the inner box 22 is formed of a compression molding capable of having a free shape by using a mixture consisting of powder obtained by pulverized urethane foam and an adhesive agent melted by heating, so that the part 51 is made to have a desirable shape following shelves, cooled air circulating grooves, etc. As the powder used herein, a pulverized resin foam such as foam of polystyrene, urethane, phenol, urea, or the like, having open cells is preferably used. However, an inorganic foam such as pearlite or particles of inorganic substance or resin may be used. Incidentally, it is preferable that gas-exhaust grooves as described in the aforementioned second embodiment with reference to FIG. 8 are provided in the inner surface of the outer box side part 25a of the structural material 25A. Other configurations including the configuration (labyrinthine structure) of corner portions of side wall structural materials and ceiling and floor structural materials, the configuration of the joint portion between the outer box 23 and the plate member 27, the composition of the adhesive agent 31, etc. are the same as those in the aforementioned embodiments.

Figure 9:
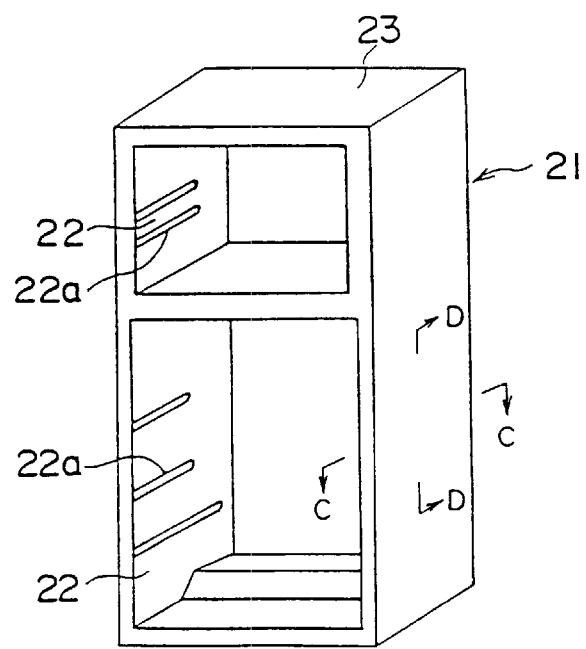
FIG. 9 is a perspective view showing a refrigerator using the full vacuum heat insulation box body according to a fourth embodiment of the present invention in the state where a door portion is removed.
Figure 11:
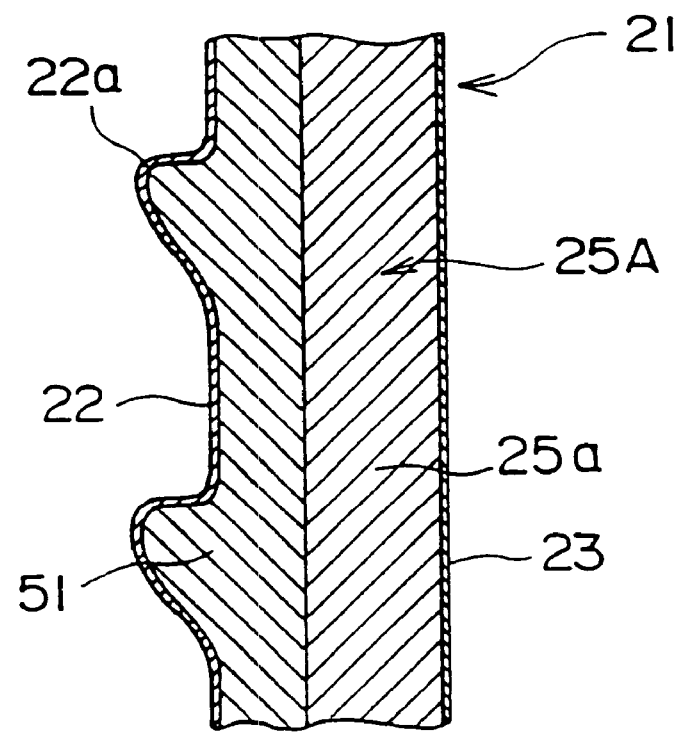
FIG. 11 is an explanatory view showing a section taken along the line D—D in FIG. 9.

A method for producing a refrigerator formed from the full vacuum heat insulation box body configured as described above will be described below on the basis of the flow chart of FIG. 12 and with reference to FIGS. 9 through 11.

First, a sheet is obtained by vapor deposition of silicon on an inner surface of a complex sheet material which consist of polystyrene resin containing butadiene rubber as a base material, acrylonitrile excellent in gas barrier property arranged on the inner side of the heat insulation wall, and polypropylene arranged on the outer side of the heat insulation wall. The thus obtained sheet is shaped into a box having upper and lower compartments by vacuum molding to thereby obtain an inner box 22 which has an uneven shape 22a in its surface and constitutes an interior surface of the shell of the refrigerator. Then, a hollow bent article integrating a ceiling, a floor and opposite sides is prepared by bending a colored steel plate to thereby obtain an outer box 23 which constitutes an exterior surface of the shell of the refrigerator. After the inner box 22 is inserted into the outer box 23, they are joined to each other at joint portions to form a first shell which is opened in the back of the outer box (step 211). The work of joining the outer box 23 and the inner box 22 is as follows.

As shown in FIG. 10, the groove 32A provided in the outer box 23 is filled with the aforementioned adhesive agent, specifically an adhesive agent 31 obtained by mixing a liquid resin such as an epoxy resin, or the like, with ceramics such as a metal oxide, or the like. After an end side portion 33A of the inner box 22 is inserted into the groove 32A filled with the adhesive agent 31, this inserted state is held until the adhesive agent 31 in the groove 32A has been hardened to thereby perform joining and sealing between the outer box 23 and the inner box 22. In this occasion, the adhesive agent 31 is charged more in the vicinity of the center of each groove to make it flow by the insertion of the inner box end side portion 33A, so that the groove 32A can be entirely filled with the adhesive agent 31 and uniform and faultless sealing is preferably obtained. By immersing the end side portion 33A of the inner box 22 in the resin in the groove 32A formed in the outer box 23 in the aforementioned manner, defects such as incompletely joined portions, and communicating portions, etc. can be eliminated, so that a refrigerator shell structure in which the joint portions are perfectly sealed is obtained. As a result, defect portions such as holes passing through the shell, etc. are reduced to secure a sealing structure having superior reliability in blocking of gas such as air, water vapor, etc. entering the heat insulation box body from the outside.

Then, structural materials to make the shell endure the atmospheric pressure to prevent the deformation of the shell during the evacuation work in the posterior step are prepared, inserted into the first shell, and then sealed with a plate member 27 from the outside (step 212). The preparation of the structural materials is as follows. First, a mixture consisting of powder of pulverized urethane foam and an adhesive agent melted by heating is compression-molded into a desirable shape following shelves, cooled air circulating grooves, etc. in the inner box 22 to thereby obtain a first structural material, that is, a structural material part 51 basically exhibiting a triangular sectional structure. Further, a foaming resin such as foaming urethane, or the like, having open cells is foamed to prepare a large slab of foamed article. Second and third structural materials are cut out from this large foamed article. That is, the second structural material is a part 25a having a triangular sectional structure so as to be disposed on the outer box 23 side, face to face with the structural material part 51 and a third structural material is a structural material 26 having a shape like a flat plate so as to be inserted in the opening portion in the back of the first shell. The structural materials thus obtained are inserted in the first shell through the opening in its back.

The insertion of the structural materials into the first shell will now be described in detail.

First, the first structural materials, that is, the structural material parts 51 are inserted in the inside of the side walls along the inner box 22 having protrusion portions such as shelves, etc. from the opening in the back of the first shell with the base portions of the structural material parts 51 as the forefronts. The second structural materials, that is, the smooth-surface parts 25a are inserted in the flat ceiling and middle wall from the opening of the back of the first shell with the base portions of the parts 25a as the forefronts. Then, a second structural material, that is, a part 25a is inserted on the outer box 23 side in the side walls face to face with the structural material parts 51 from the opening in the back of the first shell with the vertex portions of the parts 25a as the forefronts. Other second structural materials, that is, other parts 25a are inserted also in the ceiling and middle wall on the opposite side to the previously inserted parts 25a, from the opening in the back of the first shell with the vertex portions of the parts 25a as the forefronts. In this occasion, the length and thickness of the base portion of a part 25a inserted later are preferably adjusted so that the base portion of the part 25a projects backward by a slight distance, preferably, about 10 mm from an extension line of the back of the inner box 22, in the same manner as in the case of a chest freezer in the first embodiment. Accordingly, the inside of side walls and ceiling and middle wall of the first shell is filled.

After a bottom plate and a structural material are then disposed in the back portion and a floor corresponding to a machine chamber portion for mounting a compressor, etc., the opening in the back of the first shell including the machine chamber is blocked by the flat-plate like third structural material 26 and the joint portion between the plate member 27 and the first shell is sealed by an adhesive agent 31 to thereby form a fully closed second shell (step 213). Then, evacuation is performed through a not-shown vacuum valve attached to the plate member 27 (step 214). Incidentally, the vacuum valve is attached to the machine chamber portion so that the fully closed state can be kept after the evacuation.

The evacuation is started under the condition that the structural materials 25a, 51 and 26 put between the inner and outer boxes 22 and 23 are not fixed by means of an adhesive agent, or the like, before the adhesive agent 31 in the groove 32 of the joint portion 29 between the outer box 23 and the plate member 27 is hardened. The evacuation is continued until the adhesive agent 31 is hardened. Accordingly, when the evacuation is started, the plate member 27 is pulled toward the inside of the second shell according to the pressure difference between the air pressure of the inside of the second shell and the air pressure of the outside thereof. As a result, the plate member 27 functions as a piston for pressing the third structural material 26 from the back side. The parts as the second structural materials 25a inserted in the side walls, ceiling and middle wall of the shell 21, are successively pressed by the third structural material 26 pressed by the plate member 27, so that the wedge effect is produced. As a result, there is no slack in the direction of the thickness of each wall, so that the shell can be substantially entirely filled without any gap. Accordingly, even in the case where the inside of the shell reaches a vacuum state, the shell is never deformed by the atmospheric pressure. Thus, an excellent external appearance state can be kept. After the adhesive agent 31 is hardened, the inner and outer boxes 22 and 23 and the respective structural materials 25a, 51 and 26 are kept only by close contact based on a vacuum to thereby obtain a refrigerator constituted by a full vacuum heat insulation box body which is light in weight and has a uniform strength characteristic (step 215).

Incidentally, it is preferable, from the point of view of workability, to use a thixotropic adhesive agent for a portion where the groove of the joint portion of the shell is inclined horizontally. Further, by adjusting the viscosity of the adhesive agent as mentioned above, the joint portion between the inner and outer boxes 22 and 23 can be joined simultaneously with evacuation of the shell. That is, the viscosity values of adhesive agents to be charged in the grooves 32 and 32A are adjusted in accordance with the inclination of the joint portion 29 between the outer box 23 and the plate member 27 and the inclination of the joint portion between the inner and outer boxes 22 and 23, respectively, and evacuation is started before the adhesive agents in the grooves 32 and 32A is hardened, and the evacuation is continued until the adhesive agents in the grooves 32 and 32A are hardened. Accordingly, when evacuation is started, not only the plate member 27 but also the inner and outer boxes 22 and 23 can be operated as pistons to press the structural materials from the outside, so that the degree of mutual contact of the structural materials by means of a vacuum can be enhanced. Further, because it is predicted that air, water, etc. penetrate the adhesive agents to migrate into the shell, adhesive agents containing an inorganic substance are preferably used for the purpose of suppressing the penetration of air, water, etc., into the inside of the shell.

After sealing the joint portion between the outer box 23 and the plate member 27, it is effective to simply evacuate the inside of the shell to form a low vacuum state in a range from about $10^1$ to $10^2$ torr to thereby stabilize the inside of the shell so that the plate member 27 is attracted to abut on the structural materials.

By keeping the inside of the shell in a vacuum state in the aforementioned manner, the third structural material 26 is pressed from the back side by means of the plate member 27 and the structural material 25a is successively pressed by the third structural material 26 to thereby produce a wedge effect, so that slack or cavitation in the direction of the thickness of the wall is prevented. Furthermore, because the plate member 27 is fixed under the condition that the movement and contraction of the structural materials including the aforementioned behavior are stabilized, there is also produced such an effect that the shell can be prevented from being deformed at the time of or after full-scale evacuation in the posterior step for providing heat insulating property.

That is, the shell in the fully closed state after evacuation at the time of attaching the plate member 27 to the outer box 23 is again evacuated with full-scale evacuation through the vacuum valve after the attachment of the plate member 27, so that gasses such as air, etc. remaining in the shell are exhausted from the shell. Although the degree of vacuum in the shell in this occasion varies depending on the kind of the structural material used, sufficient heat insulating property can be provided when the degree of vacuum is kept higher than $10^{-0}$ torr, preferably higher than $10^{-2}$ torr. Under these conditions, the vacuum valve provided in the outer box may be replaced by a sealing valve such as a check valve, or the like.

Further, to perform evacuation for keeping a sufficient vacuum in the inside of continuous pores contained in the structural materials in the shell with a fully closed structure, it is effective that grooves or holes extending in the direction of the major axis from the portion of the vacuum valve or its vicinity are formed in advance, in structural materials formed from a solidified molding of a pulverized urethane foam and a molding cut out from a slab of foamed article. Accordingly, because gasses in pores of structural materials are conducted in the grooves or holes and exhausted therethrough easily, the time required for evacuation can be greatly shortened.

If the grooves are wide, they are apt to be deformed by the atmospheric pressure Accordingly, it is rather preferable to provide large number of grooves each having a depth so as not to hinder handling of structural materials. When, for example, grooves each having a width of 3 mm and a depth of 5 mm are formed at intervals of a pitch of 50 mm, a sufficient effect is obtained.

In order to confirm the heat insulating effect of the full vacuum heat insulation box body according to the fourth embodiment, results of evaluation of heat insulating property based on the quantity of leaking heat and design characteristic based on the smoothness of the shell wall surface in comparison of test examples 4, 5 and 6 with comparative examples 3 and 4 will be described below.

TEST EXAMPLES 4, 5 AND 6

By using a refrigerator having an internal volume of 120 L, the following test examples 4 through 6 were prepared by the producing method explained in the fourth embodiment. That is, a full vacuum heat insulation box body (test example 4) was formed by using structural materials which had no gas-exhaust groove, and which were formed by cutting a slab of urethane foam having open cells and processing the cut out pieces; another full vacuum heat insulation box body (test example 5) was formed by using structural materials which were formed by cutting a slab of foam and processing them and which were provided with grooves each having a width of 5 mm and a depth of 5 mm arranged at intervals of a pitch of 50 mm; and a further full vacuum heat insulation box body (test example 6) was formed by using structural materials which were formed by cutting a slab of foam and processing them, and which were provided with grooves each having a width of 10 mm and a depth of 5 mm arranged at intervals of a pitch of 50 mm.

Comparative Example 3

Figure 12:
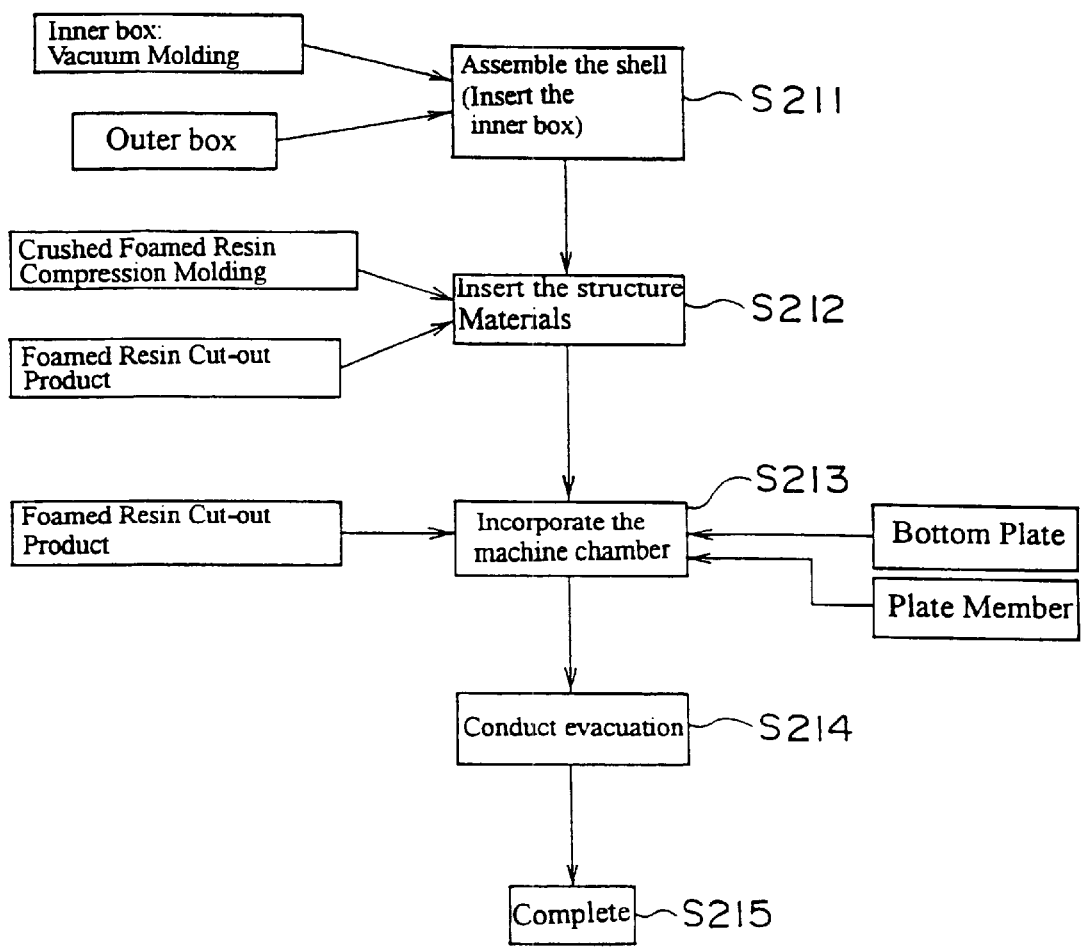
FIG. 12 is a flow chart showing a method for producing the full vacuum heat insulation box body according to the fourth embodiment.

As the steps of the fourth embodiment shown in FIG. 12, a shell comprising an inner box formed of a vacuum molding of ABS resin fitted into an outer box formed of a formed product of a colored steel plate with plurality of bent portions was attached to a jig to prevent deforming of the shell by the foaming pressure of foaming urethane. Then, two-part foaming urethane raw materials using cyclopentane as a foaming agent are mixed by means of a mixer of a high-pressure foaming machine and the mixed solution was injected from holes provided in the neighbors of longitudinal center portions on opposite side walls in the plate member in the back surface of the shell and then the holes used for injection were immediately sealed so that foaming urethane did not leak. When a reaction of the two-part raw materials was started, the mixture solution flew in the form of produced bubbles while being foamed on the basis of vaporization of cyclopentane caused by reaction heat of a resinification reaction and generation of carbon dioxide gas as a by-product of the resinification reaction. As a result, gaps in the shell were filled with the mixture solution. After the shell was left for 5 minutes during which hardening of the mixed solution was completed, the shell was taken out from the jig. Thus, there was obtained a heat insulation box body filled with closed cells.

Comparative Example 4

Two-part foaming urethane having open cells was injected into the shell in the same manner as in the comparative example 3 so that the shell was filled with the foaming urethane. After hardening was completed, the shell was taken out from the jig to thereby obtain a heat insulation box body in this comparative example 4. Incidentally, in the comparative example 4, a vacuum cock was provided in a machine chamber located in its bottom portion for receiving a compressor, etc.

The content of evaluation is as follows. Incidentally, a door used in the same refrigerator as an existing product was used for the opening portion of the refrigerator in common to the test examples 4, 5 and 6 and the comparative examples 3 and 4.
(1) Weight of Structural Material
The weight of structural materials put in the shell was measured.
In all the heat insulation box body, weight increase, that is, the difference between weight before putting in structural materials and weight after putting in structural materials, was employed.
(2) Heat Insulating Property
The quantity of leaking heat and the change thereof with the passage of time were evaluated.
The quantity of leaking heat was obtained on the basis of electric energy which was given when the inside of a refrigerator equipped with a heater of known heating power in its center portion was kept at an arbitrary temperature in the condition that the refrigerator was put in an thermostatic chamber kept at another arbitrary temperature. As the temperature conditions used in this occasion, the temperature of the inside of the thermostatic chamber and the temperature of the inside of each refrigerator as a sample were set to −0° C. and +30° C., respectively.
(3) Efficiency in Evacuation
The time required from the start of evacuation by use of a vacuum pump having a gas-exhaust capacity of 1500 L/min to the end when a vacuum value of 0.05 torr is confirmed by use of a Pirani vacuum gauge disposed in a portion of a vacuum cock. After the heat insulation box body was held for 60 seconds after the confirmation of this value, the vacuum cock was closed so that air, or the like, did not enter the heat insulation box body from the outside. Thus, the evacuation of the heat insulation box body was completed.
The degree of vacuum after 2 hours and the degree of vacuum after 48 hours from the completion of the evacuation of the heat insulation box body were measured by use of the Pirani vacuum gauge.
Efficiency in evacuation was evaluated on the basis of the time required for evacuation and the quantity of reduction of the degree of vacuum.
(4) Design Characteristic in External Appearance
A result of comparison of smoothness in external appearance by eye observation was evaluated as design characteristic in external appearance so as to be classified into five-stage levels based on the comparative example 3 representing a conventional product.
Results of the items (1) to (4) are shown in the following Table 2.

TABLE 2

| | Test Ex. 4 | Test Ex. 5 | Test Ex.6 | Comp. Ex. 3 | Comp. Ex. 4 |
|---|---|---|---|---|---|
| Weight of Structural Materials (kg) | 3.7 | 3.7 | 3.7 | 2.9 | 4.4 |
| Quantity of Leaking Heat (kcal/h) | 22.1 | 22.5 | 22.7 | 28.9 | 26.1 |
| Vacuum Reaching Time (sec) | 116 | 108 | 104 | — | 155 |
| Chang of Degree of Vacuum with the Passage of Time (torr) | | | | | |
| 2 hours | 0.06 | 0.06 | 0.06 | — | 0.72 |
| 48 hours | 0.08 | 0.07 | 0.07 | — | 1.43 |
| Smoothness of Outer Box | 4 | 4 | 3 | 3 | 2 |

Smoothness of External Appearance:
4 = slightly good,
3 = even level,
2 = slightly bad (with no problem in practical use)

As was apparent from results of Table 2, it could be confirmed that all the heat insulation box bodies of the test examples 4, 5 and 6 had remarkably excellent heat insulating property compared with conventional heat insulation box bodies of the comparative examples 3 and 4 using closed-cell foaming urethane containing cyclopentane as a foaming agent.

First, the weight of the structural materials in each of the test examples 4, 5 and 6 and the comparative example 4 is heavier than that in the comparative example 3 as a prior art example. This is because the density of the structured materials is inevitably increased to obtain a strength necessary for preventing deformation of structural materials caused by the atmospheric pressure since the inside of the shell is in a vacuum state. Particularly with respect to the comparative example 4, the reason (why the weight of the structural materials is heavy) is because foaming urethane having open cells is inferior in fluidity, so that it is necessary to obtain both uniform quality and improved overall mechanical strength by excessive filling of the foaming urethane so as to obtain necessary performance in respective parts of the heat insulation box body.

Further, in any of the test examples 4 through 6, evacuating efficiency is improved and excellent values are exhibited in both heat insulating property and the loss of vacuum over time, compared with the comparative example 4 in which foaming urethane having open cells is injected directly to fill the shell.

Further, design characteristic in external appearance is also improved compared with the comparative examples 3 and 4. This is based on the advantage that a low-density large-strength product is obtained stably in the case of a slab of foamed article whereas in the case of injection foaming of foaming urethane having open cells, density and strength distributions are apt to become wide because remaining of closed cells and non-reacted components, absorption of the foaming agent onto the resin, etc. occur frequently and also because the fluidity of bubbles at the time of formation of the heat insulation box body is inferior so that a uniform product is not obtained, as described in the aforementioned first embodiment.

In addition, from a slab of foamed-article, it is possible to selectively obtain a portion containing a very large number of open cells, and further, the amount of gasses generated by structural materials under the condition that the inside of the heat insulation box body is in a vacuum state can be better suppressed because processes such as heating of the cut-out structural materials, drying of the structural materials under a vacuum state, etc. can be made easily. Accordingly, lowering of heat insulating property depending on the degree of vacuum can be suppressed so that the improvement of reliability against vacuum loss from the inside over time can be achieved, and further, the operating time of the evacuator can be shortened correspondingly so that more power saving can be achieved with the refrigerator using this heat insulation box body.

Further, with respect to the design characteristic in external appearance, in comparison between the test examples 4 through 6, the uneven portions such as shelf rests, etc. of the inner box are never deformed and never dented by the atmospheric pressure exerted by a vacuum state kept in the inside of the shell. Further, any of the full vacuum heat insulation box body exhibits good heat insulating property compared with the comparative example 4.

On the other hand, in the case where gas-exhaust grooves are provided on surfaces of structural materials located in the center portion in the direction of the thickness of the wall, slight undulation appears in the test example 6 in which the grooves are wide but design characteristic in external appearance is only minimally degraded.

Further, in the test example 4 in which no groove is provided, there is obtained a result that heat insulating property just after evacuation is slightly inferior to that in the test example 5.

Although these results vary in accordance with the hardness and the size of pores of the structural materials, it is considered that the results do not so widely depart from the values of this evaluation, when taking a range satisfying preferable conditions in both the economy and properties such as heat insulating property, or the like, into consideration.

It is inferred from the above results that the structural materials are most preferably provided with gas-exhaust grooves each having a width of about 5 mm in the neighbor of the center in the direction of the thickness of the wall.

In the fourth embodiment, instead of the method of injecting foaming urethane having open cells into the shell to fill the latter with the foaming urethane, compression moldings of a mixture of pulverized urethane foam having open cells and an adhesive agent melted by heating or moldings cut out from a slab of urethane foam having open cells are used as structural materials. Accordingly, the remaining quantity of dispersion components in a vacuum, such as non-reacted components of foaming urethane, gasses adsorbed onto the foamed resin agent, etc., is reduced and an advantage that a low-density large-strength product is obtained stably can be brought about.

In addition, in the case of a slab of foamed article, open cell portions located in the vicinity of the center can be selectively cut out and the quantity of gasses generated from structural materials under the condition that the inside of the heat insulation box body is in a vacuum state can be better suppressed because processes such as heating of the cut-out structural materials, drying of the structural materials under a vacuum state, etc. can be made. Accordingly, the lowering of heat insulating property depending on the loss of vacuum over time can be suppressed, so that electric energy required for operating a refrigerant circuit and devices pertinent to the refrigerant circuit can be reduced and also, when, for example, an evacuator is attached to the refrigerator in order to keep the degree of vacuum, the operating time of the evacuator can be shortened greatly so that more power savings can be achieved.

Embodiment 5

Figure 13:
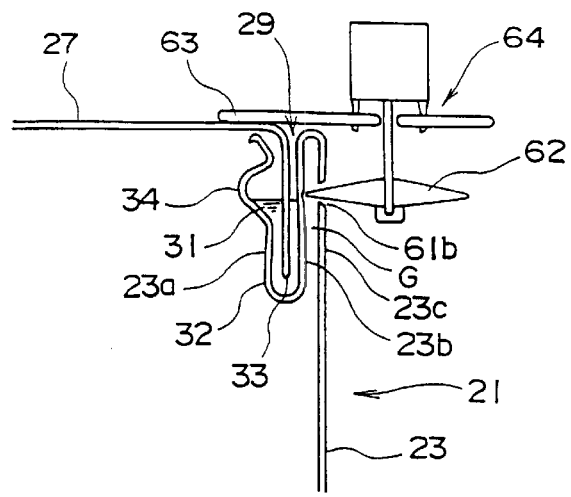
FIG. 13 is an explanatory view showing a method for disassembling a full vacuum heat insulation box body according to a fifth embodiment of the present invention.
Figure 14:
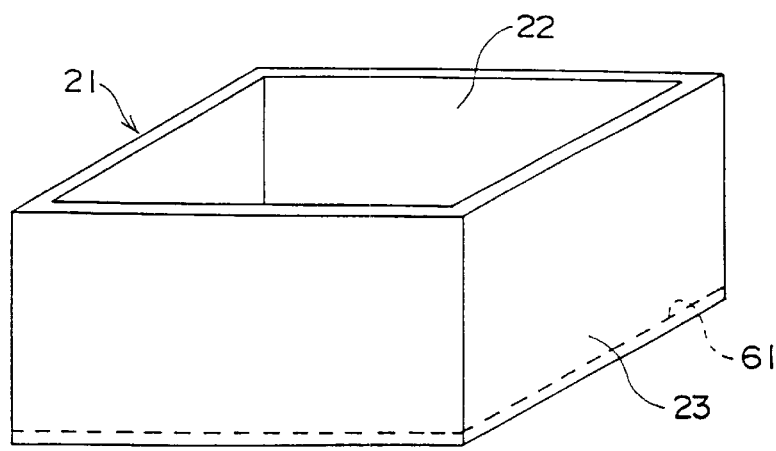
FIG. 14 is a perspective view showing the full vacuum heat insulation box body according to the fifth embodiment.
Figure 15:
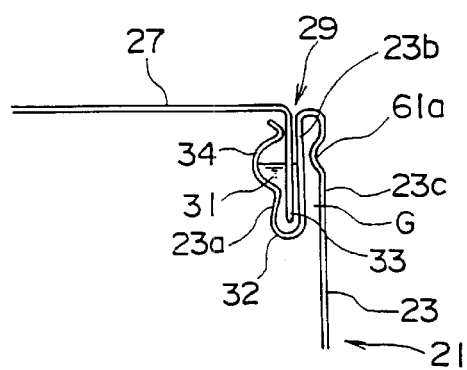
FIG. 15 is an enlarged sectional view showing a shell constituent member joint portion which is a main part of the full vacuum heat insulation box body according to the fifth embodiment.
Figure 16:
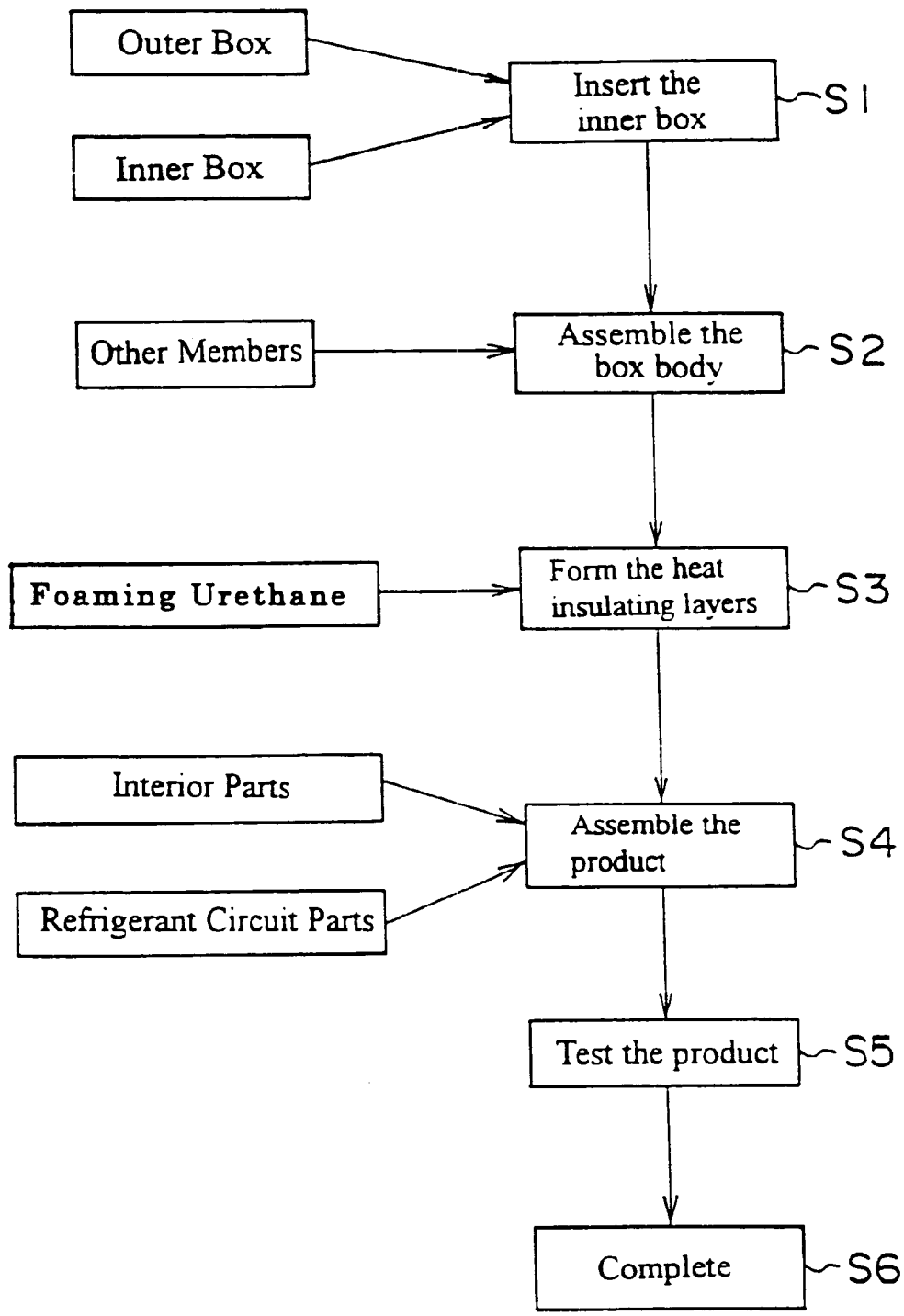
FIG. 16 is a flow chart showing steps for producing a conventional refrigerator.
Figure 17:
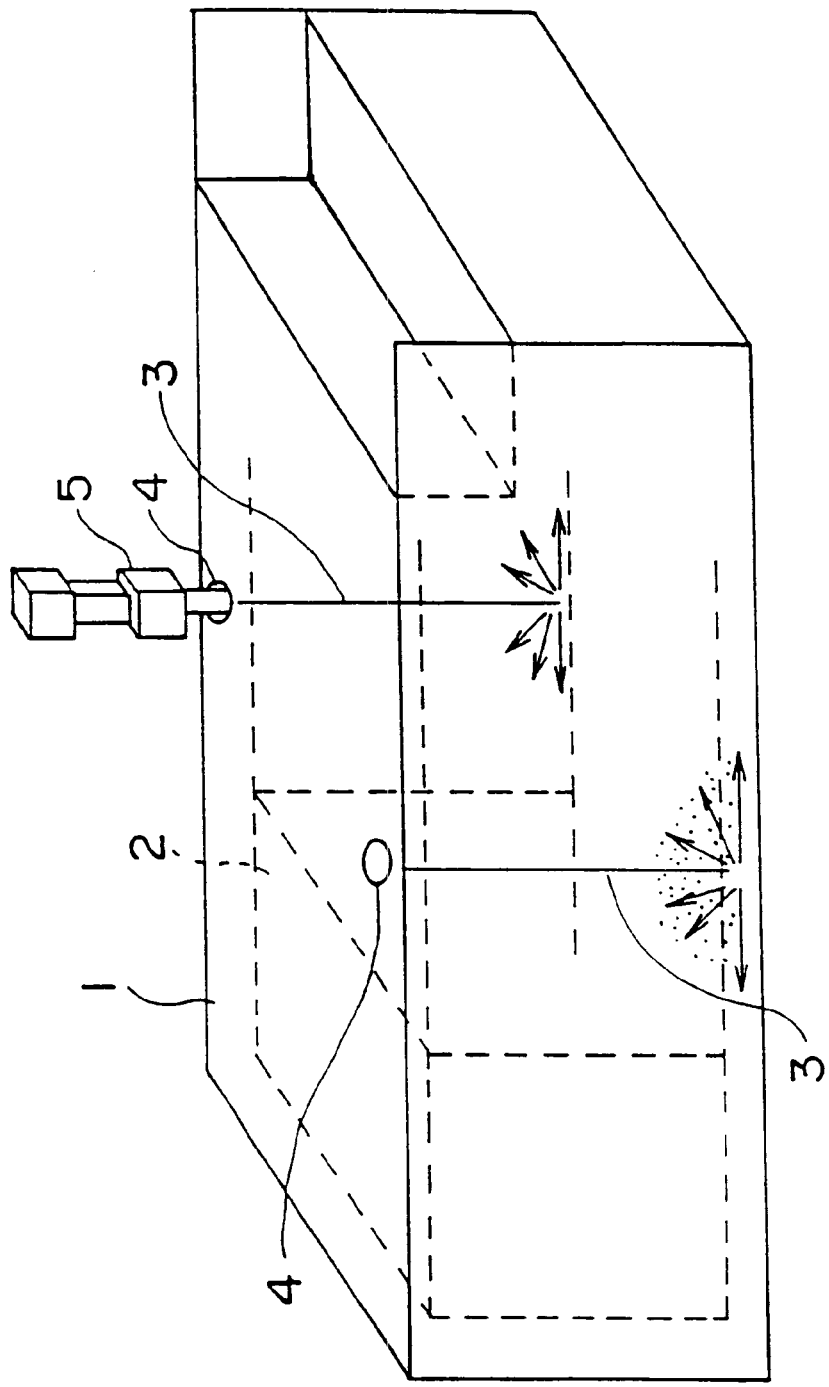
FIG. 17 is an explanatory view showing a foaming urethane injection step in the conventional refrigerator producing process.
Figure 18:
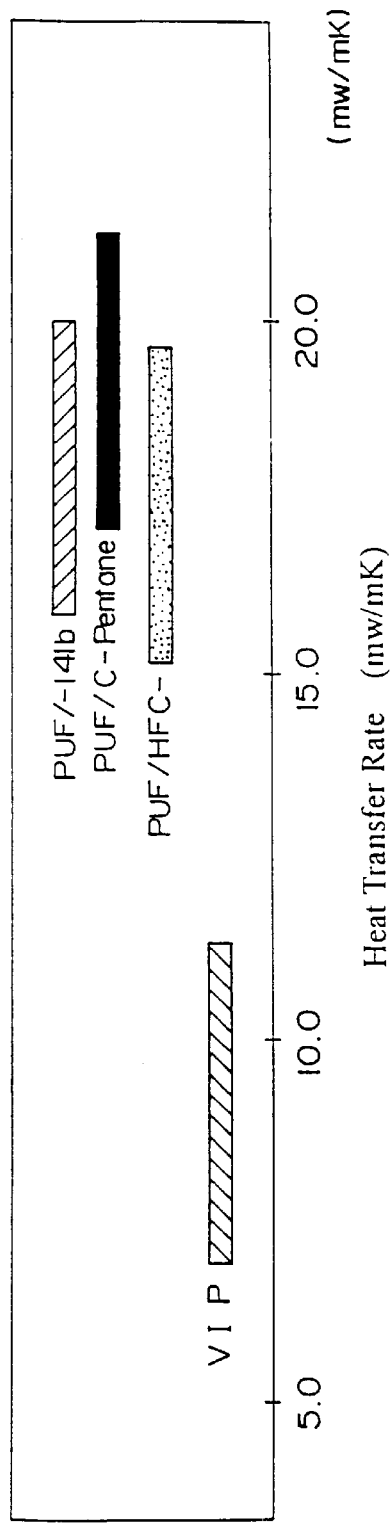
FIG. 18 is an explanatory view showing heat insulating property in various kinds of heat insulating materials.
Figure 19:
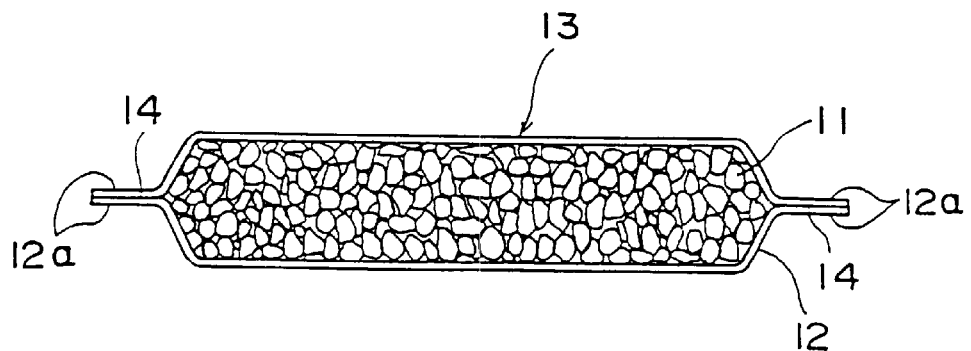
FIG. 19 is a sectional view showing the structure of a vacuum heat insulation panel.
Figure 20:
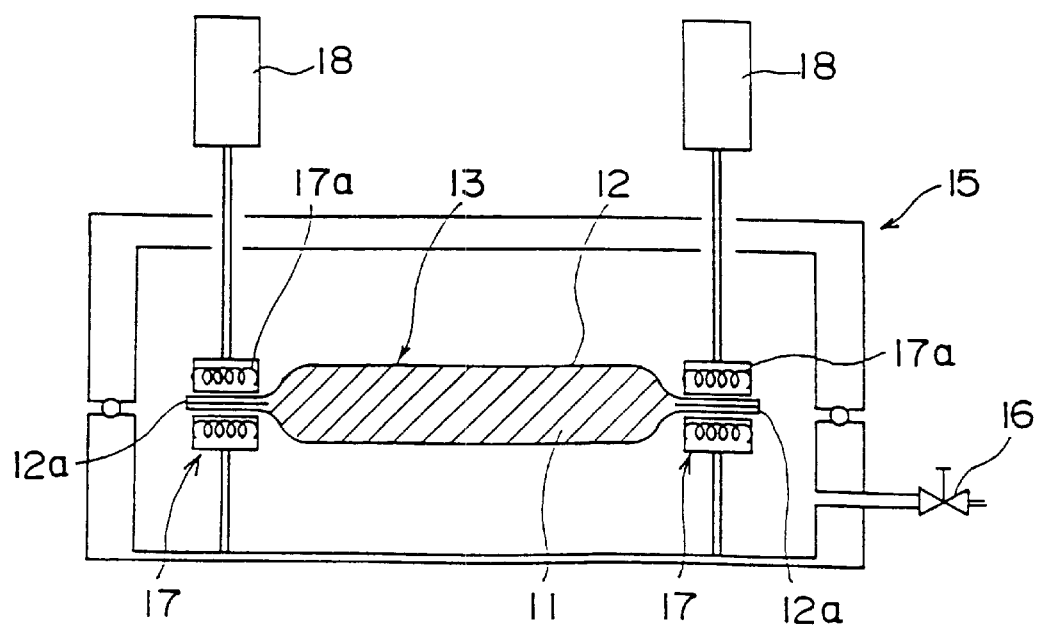
FIG. 20 is a sectional view showing the configuration of a vacuum panel making machine.

Referring now to FIGS. 13–15, the same parts as those in the first, second, third and fourth embodiments are referenced correspondingly. Incidentally, only a joint portion between the outer box and the plate member is representatively shown here as a joint portion of the shell constituent members. As to the joint portion between the outer box and inner box FIG. 10 is referred to.

The full vacuum heat insulation box body in this embodiment is applied to a chest freezer. The configuration of joint portions between constituent members of the shell 21 constituted by the outer and inner boxes 23 and 22 and the plate member 27 and the configuration of structural materials (not shown) inserted in the shell are substantially the same as in the aforementioned embodiments. This embodiment is different from the aforementioned embodiments in that a mark 61 as shown in FIG. 14 is provided to indicate a preferable cutting position of the shell surface at the time of disassembling. Here, the mark 61 is formed by a concave line 61a as shown in FIG. 15.

In more detail, as shown in FIGS. 13 and 15, the joint portion 29 between the outer box 23 and the plate member 27 is constituted by a groove 32 having a predetermined depth which is formed by bending an end edge portion of the outer box 23 inward in zigzag and filled with an adhesive agent 31 of a liquid substance having an adhesive sealing function, and an end side portion 33 formed in the plate member 27 which can be inserted into a deep portion of the groove 32. The mark 61, that is, the concave line 61a is formed in a position which is on the outer circumferential surface of the outer box 23 having the zigzag bent portion and which corresponds to the zigzag bent portion, that is, in a portion 23c which is opposed to the base end side piece 23b of the zigzag bent portion.

Further, if the joint portion between the outer and inner boxes 22 and 23 is intended to be used for the cutting position of the shell surface at the time of disassembling, a mark formed by a concave line, or the like, is given clearly to a position which is on the outer circumferential surface of the outer box 23 having the zigzag bent portion forming the groove 32A shown in FIG. 10 and which corresponds to the zigzag bent portion.

That is, a gap which is continuous over the whole circumference of the joint portion between the outer and inner boxes 23 and 22 is also formed as a groove between the base end side piece 23b of the zigzag bent portion and a portion 23a on the extreme end surface of the outer box 23 opposite to the base end side piece 23b of the zigzag bent portion. Further, a gap G which is continuous over the whole circumference of the joint portion 29 is formed between the base end side piece 23b and the portion 23c on the outer circumferential surface of the outer box 23 opposite to the base end side piece 23b of the zigzag bent portion. Gap G is outside the grooves 32 and 32A, that is, inside the shell 21, and is a portion which is not filled with the adhesive agent 31, so that this gap is not fixed. Accordingly, by cutting the portion corresponding to the zigzag bent portion on the outer circumferential surface of the outer box 23 (portion of concave line 61a) at the time of disassembling, air can be introduced into the shell 21 easily. Because structural materials disposed in the shell 21 constituted by the outer and inner boxes 23 and 22 and the plate member 27 are fixed to the shell 21 only by close contact by means of a vacuum, the close-contact state of the respective members is released so that the members are peeled off and separated easily when the inside of the shell 21 is returned to an atmospheric pressure state by introduction of air.

A method for disassembling the full vacuum heat insulation box body, that is, the chest freezer configured as described above will be described below with reference to FIGS. 13 through 15 showing the joint portion 29 between the outer box 23 and the plate member 27 cut by way of example. First, a notch 61b having a depth of the order of mm, preferably, in a range from 1 to 5 mm, is formed perpendicularly to the outer surface of the outer box along a portion forming a preferable cutting position of shell surface in the joint portion 29 between the outer box 23 and the plate member 27 located on the bottom surface, for example, along the mark 61 formed by the concave line 61a provided in a position corresponding to the reservoir portion 34 in the outer surface of the outer box. The notch 61b is formed over the whole outer circumference of the joint portion 29. The reservoir portion 34 is formed in a predetermined position by use of a roll making machine, or the like. Accordingly, the aforementioned cutting operation can be carried out efficiently if a cutter 64 provided with a cutting guide 63 for guiding the tip of a cutting edge 62 to a position at a predetermined distance from an end side of the outer box 23 as shown in FIG. 13 is used.

The reason why the shell surface cutting position is set to a position corresponding to the reservoir portion 34 is that the shell surface can be cut easily in this position without the necessity of keeping high accuracy in the direction of the cutting depth compared with the other flat surface portions of the outer box because four steel plates and two or more gap portions are formed in this position by the zigzag bent portion of the outer box 23 and the end side portion 33 of the plate member 27 inserted in the groove 32 before the structural material is reached.

As described above, the gap G which is continuous over the whole circumference is formed in the joint portion 29 between the outer box 23 and the plate member 27 and also the structural materials disposed in the shell 21 constituted by the outer and inner boxes 23 and 22 and the plate member 27 are fixed to the shell 21 only by close-contact by means of a vacuum without use of any adhesive agent. Accordingly, if air is introduced into the shell 21 through the notch 61b so that the vacuum state is eliminated, the close-contact of the structural materials with the inner and outer boxes 22 and 23 is released so that they are naturally peeled off and separated easily.

When the outer circumference of the outer box 23 is cut along the mark 61 represented by the broken line in FIG. 14 in the aforementioned manner and then the plate member 27 capable of being cut off by cutting the outer circumference of the outer box 23 is removed, the structural materials can be taken out and recovered easily without injury.

Further, if the mark 61 is formed by the concave line 61a as shown in FIG. 15, the cutting edge 62 can be guided by the walls on opposite sides of the concave line 61a. Accordingly, the cutter 64 holding a depth can be used, so that the aforementioned cutting operation can be carried out more simply and more easily.

As described above, in the method for disassembling the full vacuum heat insulation box body according to the present invention, structural materials can be recovered without injury, so that the structural materials can be used again as structural materials of a similar full vacuum heat insulation box body. Further, the shell members comprising the inner and outer boxes 22 and 23 joined to each other can be joined again to the plate member 27 and recycled if a simple repair operation is carried out, that is, if, for example a new joint portion prepared separately is joined to the shell members or a new joint portion is formed in the plate member 27.

Further, if all the joint portion between the inner and outer boxes 22 and 23 and the joint portion between the outer box 23 and the plate member 27 are removed, members usable for some other purpose can be obtained. By melting, or the like, usable raw materials with a small impurity content can be also recovered from the members. Accordingly, it is possible to collect members which are usable for various purposes.

Having now fully described the present invention, it will be apparent to one of ordinary skill in the art that many changes and modifications can be made thereto without departing from the spirit and scope of the invention as set forth herein. This application is based on Japanese Patent Application No. 10-013873 filed on Jan. 27, 1998 and Japanese Patent Application No. 10-207647 filed on Jul. 23, 1998, the entire contents of which are hereby incorporated by reference.

What is claimed and new and desired to be secured by Letters Patent of the United States is:

1. A vacuum heat insulation box body comprising:

a shell comprising an inner box and an outer box, said inner box and said outer box defining heat insulation walls, an interior of said heat insulation walls being provided in a vacuum state; and structural materials having continuous pores provided inside said insulation walls of said shell, and between said inner and outer boxes;

wherein said outer box and said inner box are pressed against said structural materials by said vacuum state, and wherein said structural materials comprise a plurality of triangular-section parts.

2. A vacuum heat insulation box body according to claim 1, wherein said structural materials are constituted by a resin foam having open cells.

* * * * *